US011002308B2

(12) United States Patent
Chmelar

(10) Patent No.: US 11,002,308 B2
(45) Date of Patent: May 11, 2021

(54) HOOK DEVICE WITH OPPOSING JAWS

(71) Applicant: Erik Vaclav Chmelar, Ann Arbor, MI (US)

(72) Inventor: Erik Vaclav Chmelar, Ann Arbor, MI (US)

( * ) Notice: Subject to any disclaimer, the term of this patent is extended or adjusted under 35 U.S.C. 154(b) by 381 days.

(21) Appl. No.: 15/784,174

(22) Filed: Oct. 15, 2017

(65) Prior Publication Data

US 2018/0187712 A1     Jul. 5, 2018

Related U.S. Application Data

(60) Provisional application No. 62/441,409, filed on Jan. 1, 2017.

(51) Int. Cl.
*F16B 45/00*     (2006.01)
*F16B 45/06*     (2006.01)
*B60P 7/08*     (2006.01)
*F16B 2/10*     (2006.01)

(52) U.S. Cl.
CPC ............ *F16B 45/06* (2013.01); *B60P 7/0823* (2013.01); *F16B 2/10* (2013.01); *F16B 45/00* (2013.01)

(58) Field of Classification Search
CPC ................................ F16B 45/06; B60P 7/0823
See application file for complete search history.

(56) References Cited

U.S. PATENT DOCUMENTS

| | | | | |
|---|---|---|---|---|
| 311,523 A * | 2/1885 | Patterson | ................. | H02G 7/10 248/61 |
| 656,923 A * | 8/1900 | Beard | ...................... | H02G 7/10 248/61 |
| 805,646 A * | 11/1905 | Hubbard | ................ | A44C 5/145 24/600.9 |
| 1,241,806 A * | 10/1917 | Anderson | ............... | F16B 45/06 24/598.5 |
| 1,262,974 A * | 4/1918 | Pearen | .................... | F16B 45/02 24/598.5 |
| 1,686,424 A * | 10/1928 | Thomson | .............. | F16G 11/048 24/136 R |
| 2,840,898 A * | 7/1958 | Yeo | ......................... | F16B 45/06 72/377 |
| 2,910,749 A * | 11/1959 | Parker | ...................... | B42F 1/08 24/67.9 |
| 3,095,624 A * | 7/1963 | Croisant | .................... | B42F 1/08 24/67.9 |
| 3,105,278 A * | 10/1963 | Sponsel | .................... | B42F 1/08 24/67.9 |
| 3,748,703 A | 7/1973 | Mailocheau | | |
| 4,065,833 A * | 1/1978 | Bender | ................... | F16B 45/06 24/582.13 |
| 4,380,101 A | 4/1983 | Joubert et al. | | |
| 4,966,344 A * | 10/1990 | Gary | ...................... | A47G 33/10 24/532 |

(Continued)

*Primary Examiner* — Jason W San
(74) *Attorney, Agent, or Firm* — Erik Chmelar

(57) ABSTRACT

A hook device for bungee cords comprising a pair of opposing hooks whose bends substantially overlap when the device is in a closed configuration. The hooks may rotate away from each other into an opened configuration to enclose an object, and the hooks may rotate towards each other into a crossed configuration to provide a pull tab. The hooks are resistively held in each configuration by retaining elements. One hook may have a shallow throat to enable insertion into narrow openings.

6 Claims, 23 Drawing Sheets

FIG. 2A

(56) References Cited

U.S. PATENT DOCUMENTS

| | | | | |
|---|---|---|---|---|
| 5,042,191 | A * | 8/1991 | Fett | A01K 91/04 43/44.83 |
| 5,050,273 | A * | 9/1991 | Okura | F16L 3/133 24/136 R |
| 5,317,788 | A | 6/1994 | Esposito et al. | |
| D410,378 | S * | 6/1999 | Aganian | D8/367 |
| 6,237,201 | B1 * | 5/2001 | Bonaiti | F16B 45/02 24/598.5 |
| 6,243,922 | B1 * | 6/2001 | Simon | A44B 15/00 24/3.6 |
| 6,308,383 | B1 * | 10/2001 | Schrader | B60P 7/0807 24/136 R |
| 6,402,113 | B1 * | 6/2002 | Chang | F16G 11/00 248/215 |
| 6,412,152 | B1 * | 7/2002 | Ayliffe | F16B 2/22 24/499 |
| 6,460,225 | B1 | 10/2002 | Brault | |
| D568,145 | S * | 5/2008 | Handel | D8/370 |
| 8,020,337 | B1 * | 9/2011 | Batton | A01K 83/02 43/36 |
| 9,249,825 | B1 * | 2/2016 | Cornay | F16B 45/00 |
| 9,341,203 | B1 * | 5/2016 | Disharoon | F16B 2/248 |
| 9,599,145 | B2 * | 3/2017 | Durfee | A01K 27/005 |
| 10,174,784 | B1 * | 1/2019 | Cornay | F16B 45/00 |
| 10,731,728 | B2 * | 8/2020 | Horgan | F16G 15/00 |
| 2004/0123432 | A1 * | 7/2004 | Santisi | B62J 7/08 24/300 |
| 2004/0134118 | A1 * | 7/2004 | Miller | A01K 83/02 43/34 |
| 2007/0130734 | A1 * | 6/2007 | Handel | B62J 7/08 24/599.1 |
| 2007/0284326 | A1 * | 12/2007 | Baloun | B65D 57/00 211/182 |
| 2010/0024177 | A1 * | 2/2010 | Hayes | F16B 45/00 24/588.1 |
| 2012/0273640 | A1 * | 11/2012 | Fathi | A44B 15/005 248/316.5 |
| 2013/0232733 | A1 * | 9/2013 | Jacobson | A44B 11/28 24/301 |
| 2014/0053372 | A1 * | 2/2014 | Jacobson | A44B 11/28 24/300 |
| 2015/0275958 | A1 * | 10/2015 | Jacobson | B21F 45/16 24/301 |
| 2018/0187713 | A1 * | 7/2018 | Chmelar | F16B 2/10 |

* cited by examiner

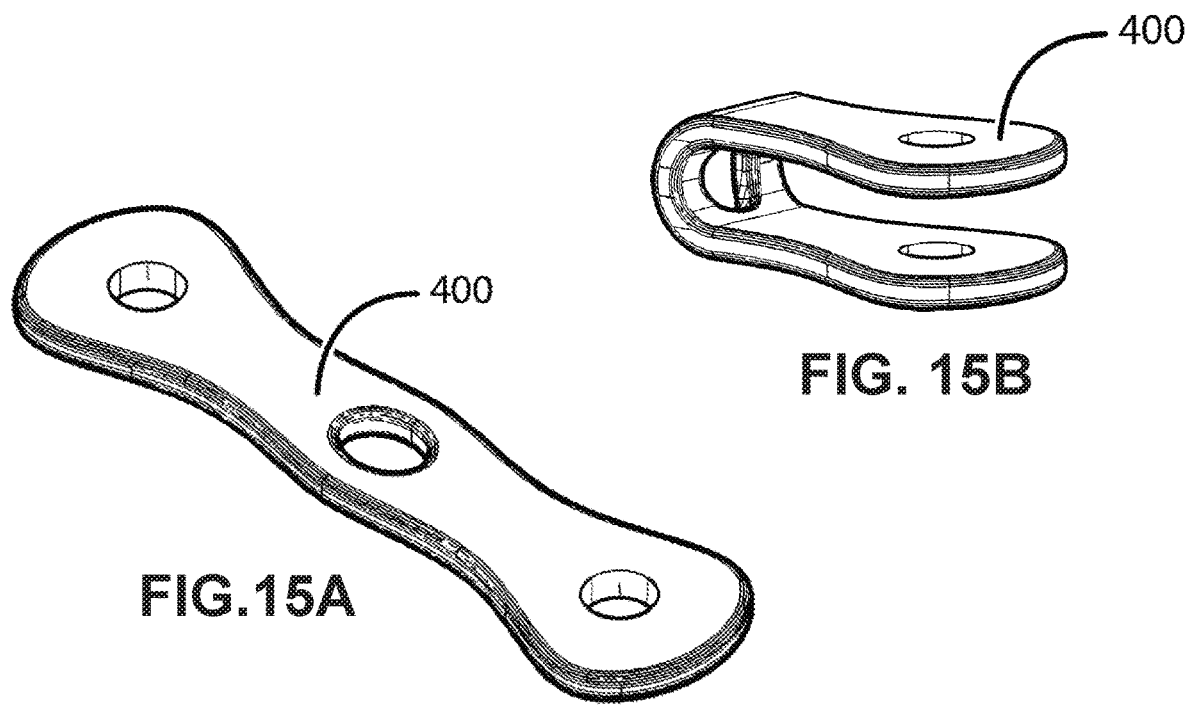
FIG. 15B
FIG. 15A
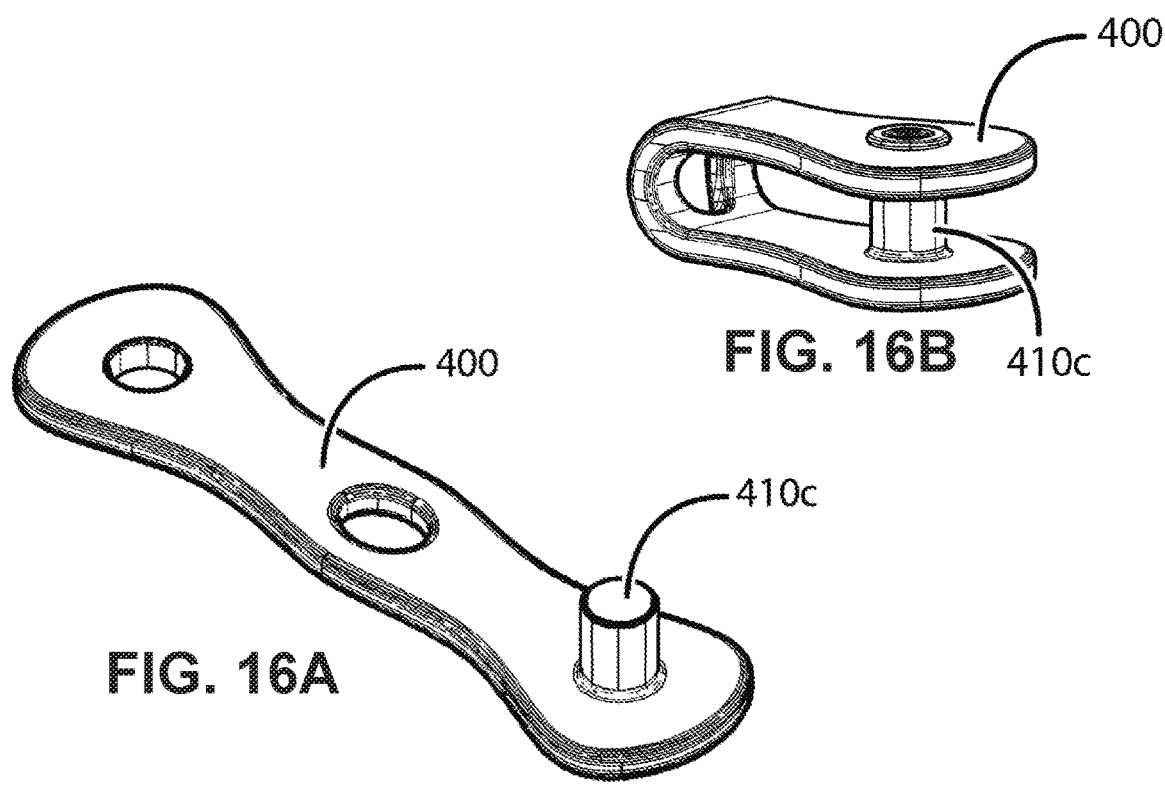
FIG. 16B  410c
FIG. 16A

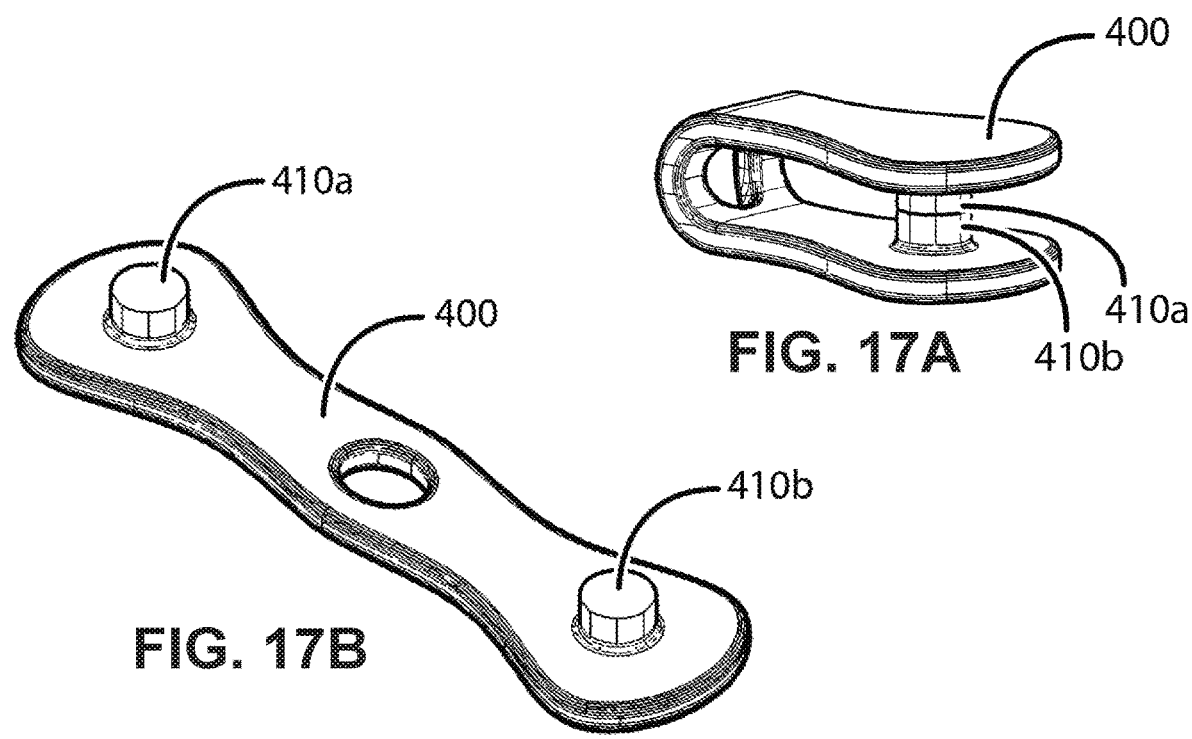
FIG. 17A
FIG. 17B
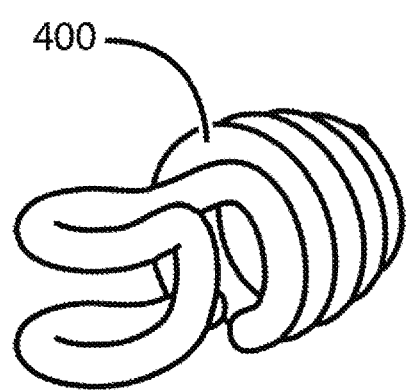
FIG. 18A
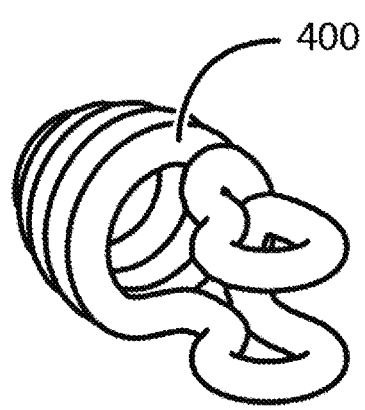
FIG. 18B

HOOK DEVICE WITH OPPOSING JAWS

CROSS-REFERENCE TO RELATED APPLICATIONS

This application is claims the benefit of provisional U.S. Pat. App. 62/441,409, filed Jan. 1, 2017. The disclosure of the prior application is incorporated herein by reference.

BACKGROUND OF THE INVENTION

The present invention relates to straps and cords for tying, bundling, or securing objects. Examples include bungee cords, tie-downs, tarp straps, cargo cords, and stretch cords (hereafter simply referred to as bungee cords, collectively). A bungee cord is generally a segment of elastic cord with a rigid hook on one or both ends. The elastic cord may be shock cord, elastic webbing, natural or synthetic rubber such as EPDM, or any suitable elastomeric material. The hook may be metal and/or plastic, and may have practically any shape, size, and strength.

The shank, gape, and throat of a hook determine the size and type of objects that can be hooked. For example, a hook having a shallow throat (short bend) may not attach securely around an object but it may be inserted into a small-diameter hole. On the other hand, a hook having a deep throat may attach securely around an object but it may not be inserted into a small-diameter hole. Most standard "S" and "C" hooks have deep throats, and are therefore not suited for all applications. Consequently, manufacturers produce bungee cords with hooks specially shaped for certain applications. For example, U.S. Pat. No. 4,995,329 discloses a hook with a restricted opening that permits a cord of a certain diameter to pass in and out of the hook when stretched but not when contracted. However, a user may want to limit the number of special-purpose bungee cords he buys or carries. U.S. Pat. No. 8,069,539 partially addresses this issue by disclosing a universal fitting that allows a user to attach differently sized and shaped hooks to the cord segment. Although this system may reduce the number of cords, it still requires the user to manage a collection of hooks.

Bungee cords having "S" or "C" hooks may frustrate a user when he attempts to remove a single bungee cord from a bin of bungee cords. Such hooks may tangle with cords and other hooks. To provide more user-friendly storage, U.S. Pat. No. 9,249,825 discloses a bungee cord with interlocking hooks to prevent tangling. Additionally, tangle-free racks and carriers for storing bungee cords have been disclosed, e.g., U.S. Pat. Nos. 5,845,787, 6,099,060, and 9,345,346.

Many "S" and "C" hooks, as well as carabiners, do not provide an adequate grip to hold on to when stretching a bungee cord. If a bungee cord recoils when a user loses his grip, it may cause injury or property damage. Additionally, if a user curls a finger around the bend of the hook, his finger may get pinched. To address these issues, U.S. Pat. Nos. 4,380,101 and 5,317,788 and US Pat. App. 2013/0232733 disclose various embodiments of disposing a pull tab on the shank of a hook for gripping with a finger.

Finally, a notable limitation of standard "S" and "C" hooks is that they may detach from an object due to slack in the cord, shifting of an object, or vibrations. Hooks such as carabiners and snap hooks address this limitation by providing a pivoting or sliding gate that creates an enclosed loop. The gate of a carabiner hook usually pivots inward, and may be biased by a spring, e.g., U.S. Pat. No. 6,606,769; a magnet, e.g., U.S. Pat. No. 8,448,307; or a flexible member, e.g., U.S. Pat. Nos. 805,646, 3,748,703, and 4,380,101. The gate may be shaped as a hook as disclosed in U.S. Pat. No. 1,686,424. That device comprises a stationary C-shaped jaw and an opposing coplanar rotatable C-shaped jaw acting as a gate. Instead of a bias means to hold the gate in the closed position, that device has a notch on the bend of the stationary jaw and a complementary rib on the bend of the rotatable jaw. However, a small amount of play in the pivot joint may cause a large planar separation between the adjacent surfaces of the bends and therefore cause the retainer to fail. That device it does not provide a means to retain the rotatable jaw in an opened position, nor does it provide a means to rotate or retain the rotatable jaw past the stationary jaw to implement a pull tab.

Four issues of hook devices have been described above: (1) a hook having either too deep too shallow of a throat; (2) a hook tangling with cords and other hooks; (3) a hook lacking an adequate grip; and (4) a hook detaching from an object. The prior art has addressed several of these issues, but with tradeoffs in functionality, cost, and/or easy or use. This disclosure teaches a hook assembly that addresses all four issues simultaneously without significant tradeoffs.

BRIEF SUMMARY OF THE INVENTION

This disclosure teaches a hook assembly that may improve the functionality of many cargo management devices, for example a bungee cord. The assembly comprises two opposing hooks (i.e., the opening of each hook faces the opening of the other hook). Each hook rotates about a pivot joint at a base so that the angle between the shanks of the hooks may vary.

The hook assembly includes a plurality of retainers adjacent to the rotational path of each shank. Each retainer retains a shank at some predetermined angle relative to the other shank or to the base. The retainers may be defined on the opposite shank, on the base, on another member, or a combination thereof. A retainer may be any element that impedes the rotation of a hook at some predetermined angle relative to the other hook, to the base, or to another member. Examples of a retainer include a depression or dimple on a surface, a trough of a corrugation, a kink or bend or deformity of a member, or any combination thereof in which a shank may rest. Alternatively, a retainer may be an elevation or bump on a surface, a peak of a corrugation, a kink or bend or deformity of a member, or any combination thereof that may engage with a depression on a shank.

A retainer may be biased by a spring or any force perpendicular to the plane of rotation. Retainers may have different retention forces. A user may overcome a retention force by applying some predetermined amount of force to a relevant hook along its path of rotation.

The distance between adjacent retainers that retain a given shank determines the discrete configurations of the hook assembly. A "closed" configuration is where the bends of the hooks superimpose each other to form a substantially closed loop. This may look like a teardrop when viewed from above or below the plane of rotation. The hook assembly may be in the closed configuration when attached to an object or when stored.

An "opened" configuration is where the angle between the shanks is increased from that of the closed configuration to create a gap between the bends. This may look like a broken heart when viewed from above or below the plane of rotation. The hook assembly may be in the opened configuration just prior to enclosing around an object. In one embodiment, the hooks may not rotate beyond the opened configuration, for example in the first embodiment described below. In another embodiment, the hooks may rotate beyond the opened configuration, for example in the third embodiment below.

A "crossed" configuration is where the angle between the shanks is decreased from that of the closed configuration to be adjacent and generally parallel to each other. This may look like a grappling hook when viewed from above or below the plane of rotation. The hook assembly may be in the crossed configuration when a user wants to have a pull tab or, if one of the hooks has a shallow throat, when the hook assembly must be secured to a small hole. In one embodiment, the hooks may not rotate beyond the closed configuration, for example in the embodiments described below. In another embodiment, the hooks may rotate beyond the closed configuration, for example where the shanks do not braid around each other.

BRIEF DESCRIPTION OF THE DRAWINGS

FIGS. 15A-17B show exemplary bases and an exemplary means to manufacture such bases by bending flat metal stock.

FIGS. 18A-18B show an exemplary base made from bent metal wire.

DETAILED DESCRIPTION OF THE INVENTION

The following numerals are used to identify the corresponding elements in the figures for the several embodiments. 200-level numbers refer to elements on or associated with the deep hook; 300-level numbers refer to elements on or associated with the shallow hook; 400-level numbers refer to elements on or associated with the base; 500-level numbers refer to elements on or associated with the panel; 600-level numbers refer to elements on or associated with the cord.

Figure 1A:
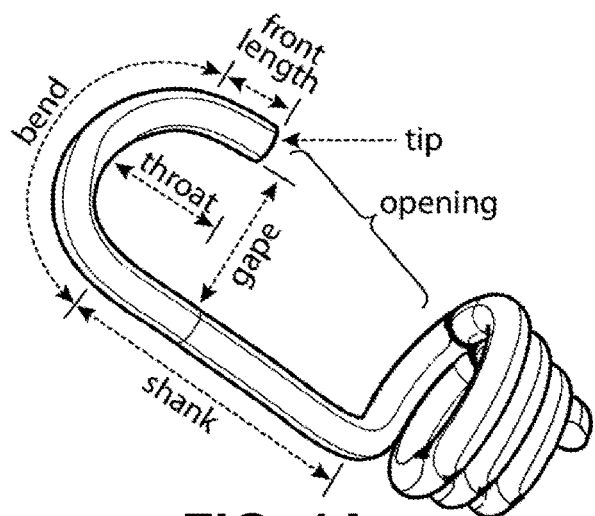
FIG. 1A shows a standard "C" hook and FIG. 1B shows a standard "S" hook.
Figure 1B:
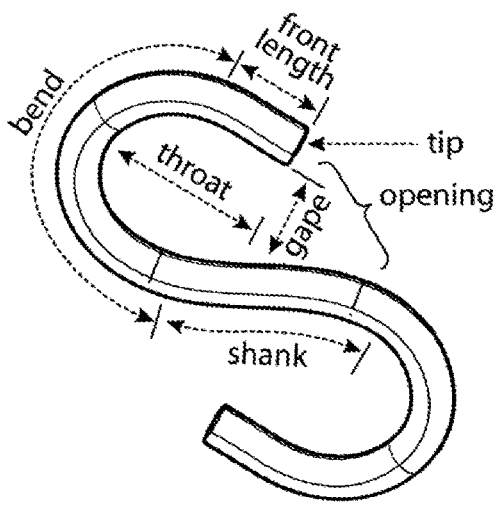

100 hook assembly
200 deep hook
210 sleeve
212 pin
220 shank
230 retainer for opened position (of shallow hook)
232 retainer for closed position (of shallow hook)
234 retainer for crossed position (of shallow hook)
240 bend
250 protrusion
300 shallow hook
310 sleeve
312 pin
320 retainer for opened position (of deep hook)
322 retainer for closed position (of deep hook)
324 retainer for crossed position (of deep hook)
330 shank
340 bend
350 protrusion
400 base
410 pin
412 sleeve
420 retainer for opened position (of deep hook)
422 retainer for closed position (of deep hook)
424 retainer for crossed position (of deep hook)
430 retainer for opened position (of shallow hook)
432 retainer for closed position (of shallow hook)
434 retainer for crossed position (of shallow hook)
500 panel
510 sleeve
520 retainer for opened position (of deep hook)
522 retainer for closed position (of deep hook)
524 retainer for crossed position (of deep hook)
530 retainer for opened position (of shallow hook)
532 retainer for closed position (of shallow hook)
534 retainer for crossed position (of shallow hook)
600 cord
660 clasp FIG. 1A shows a standard "C" hook and FIG. 1B shows a standard "S" hook. The shank is the relatively straight segment of a hook proximal to a point of attachment to a cord (although a shank may be curved). The bend is the relatively curved segment between the shank and the tip (the proximal end of the bend is adjacent to the shank and the distal end is adjacent to the tip or to a front length). A hook may have a relatively straight front length segment between the bend and the tip. The gape is the distance between the proximal end of the bend and the tip. The throat is the distance between a medial point of the bend and a medial point of a line projected from the tip to the proximal end of the bend. A deep throat corresponds to a large distance and a shallow throat corresponds to a small distance. The opening is the empty space opposite the shank and is an approximate function of the gape, throat, and shank. Hereafter the terms "hook," "jaw," and "arm" are used interchangeably to describe an elongated member having a shank, a bend, a throat, and a gape.

Figure 2A:
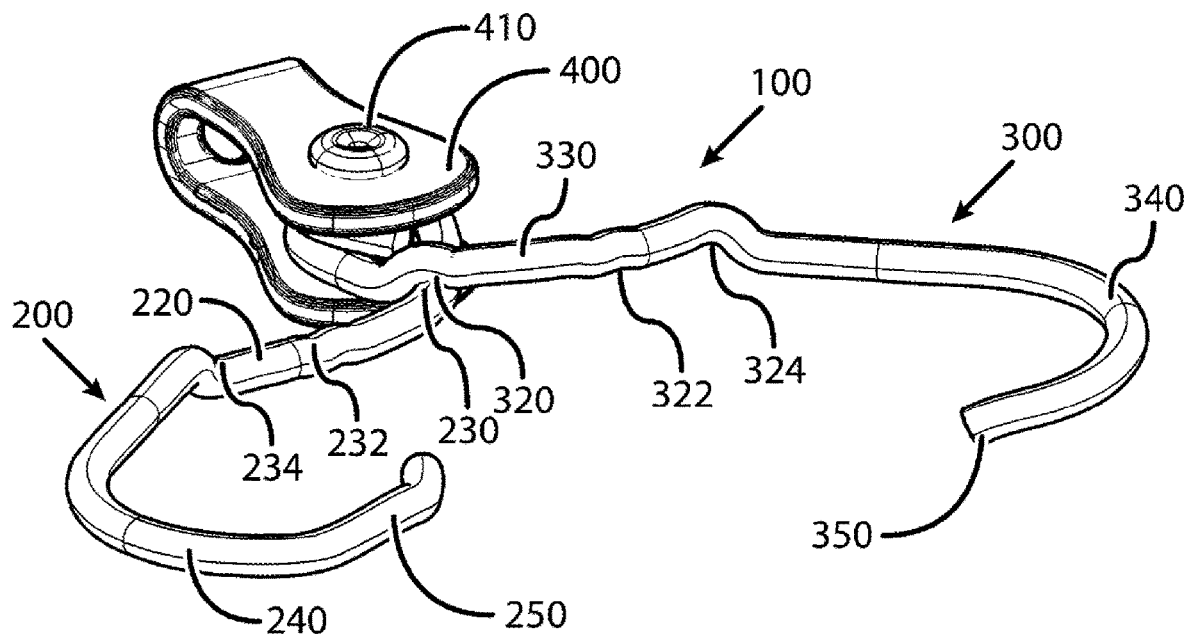
FIGS. 2A-2C show perspective views of a first embodiment in opened, closed, and crossed configurations, respectively.
Figure 2B:
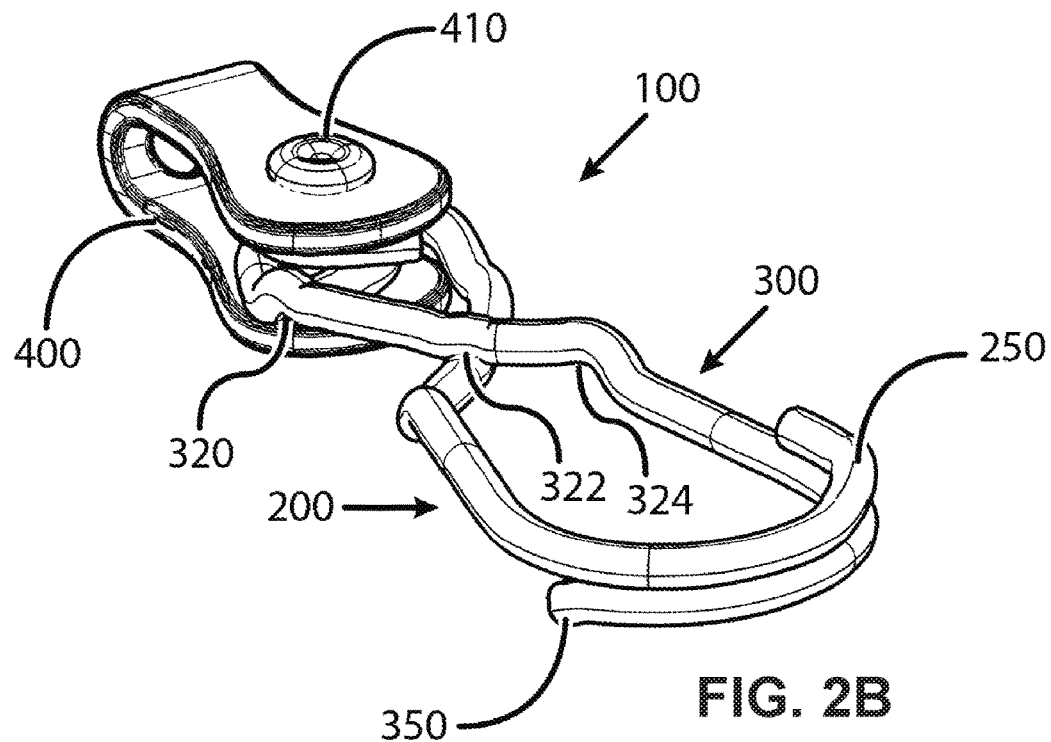
Figure 2C:
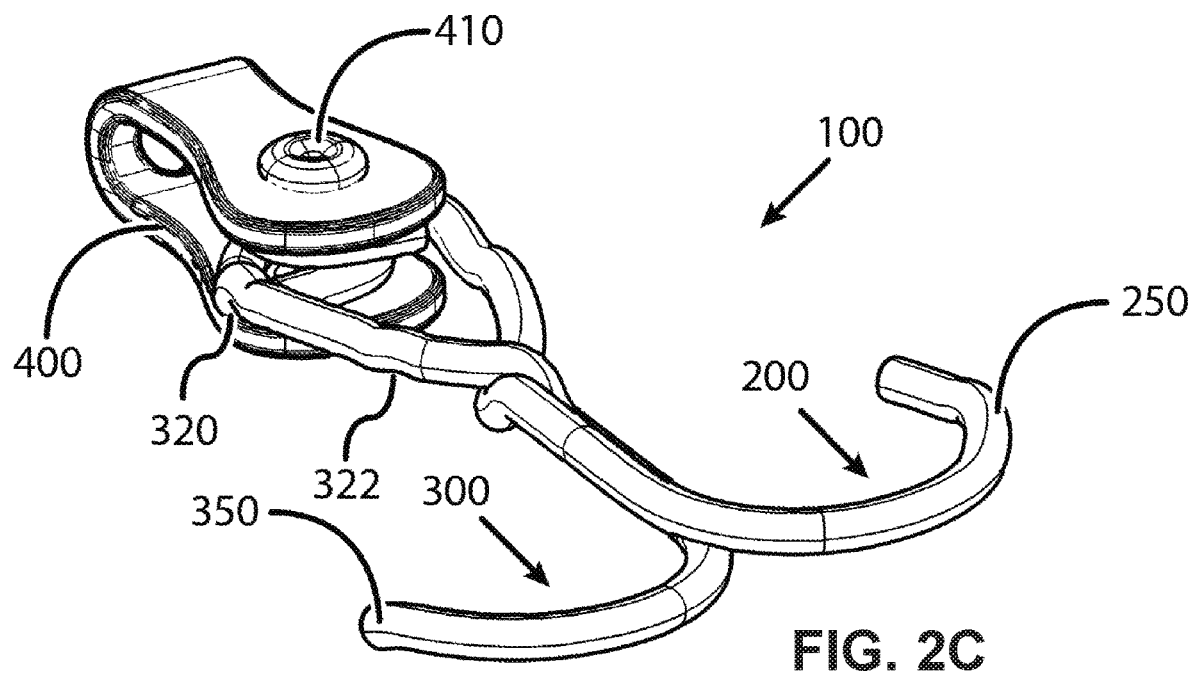
Figure 3A:
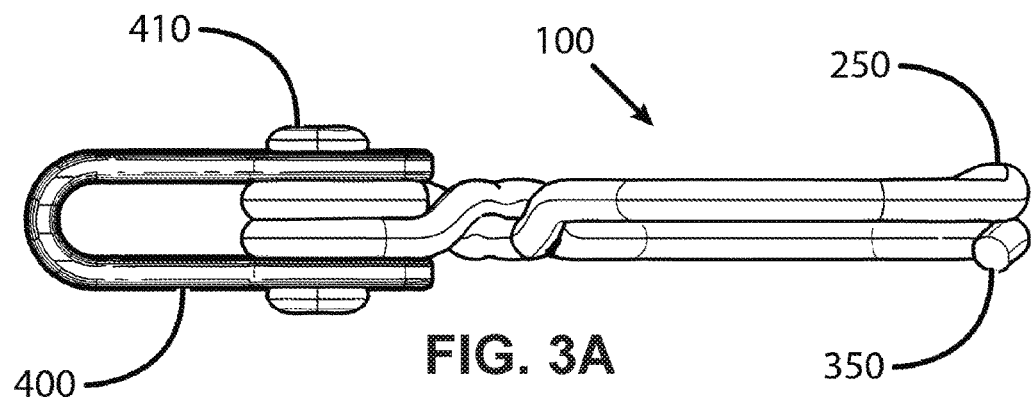
FIGS. 3A-3C show side views of the first embodiment in the opened, closed, and crossed configurations, respectively.
Figure 3B:
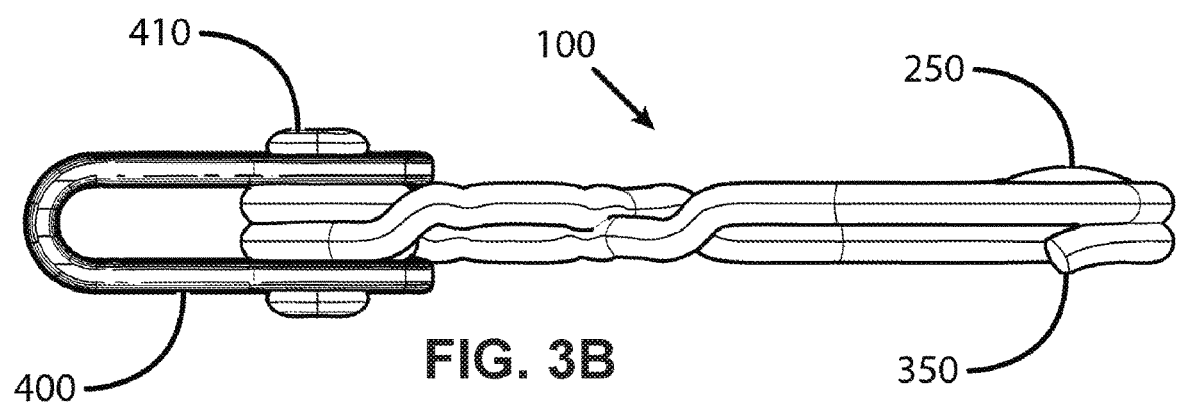
Figure 3C:
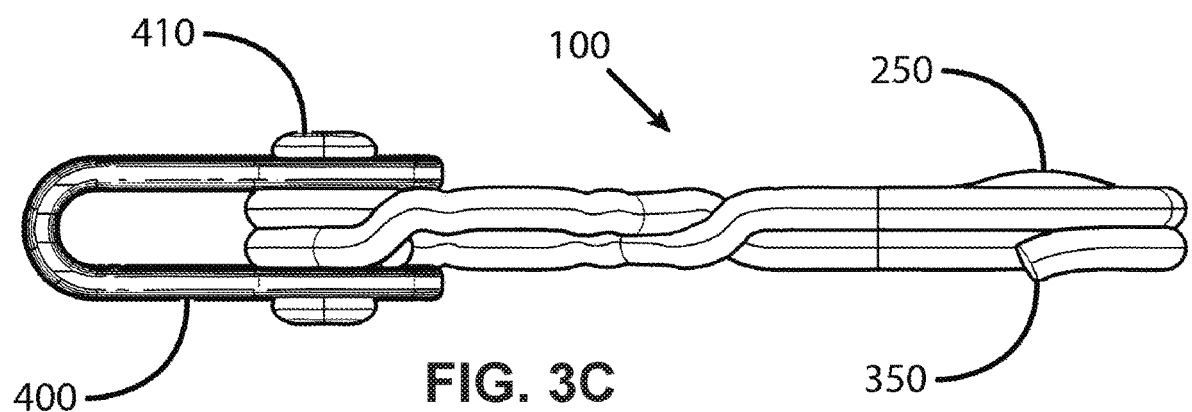
Figure 4A:
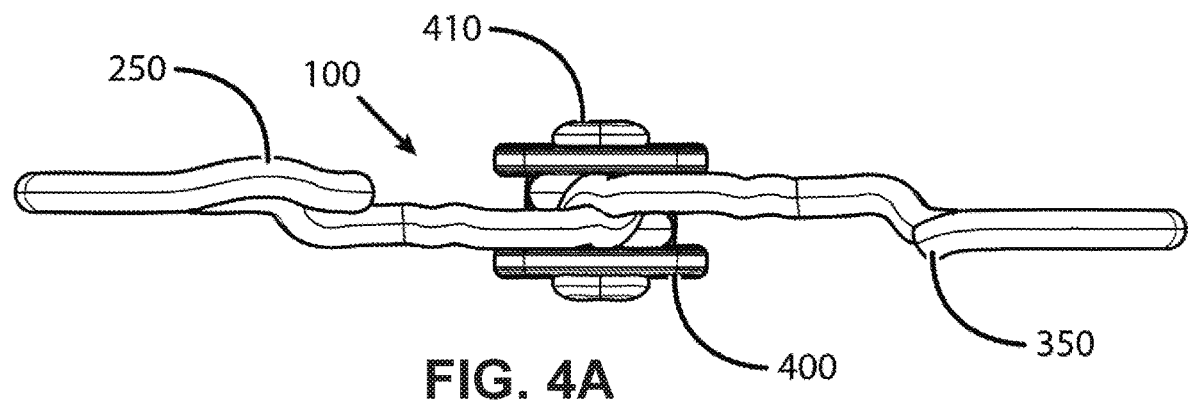
FIGS. 4A-4C show front views of the first embodiment in the opened, closed, and crossed configurations, respectively.
Figure 4B:
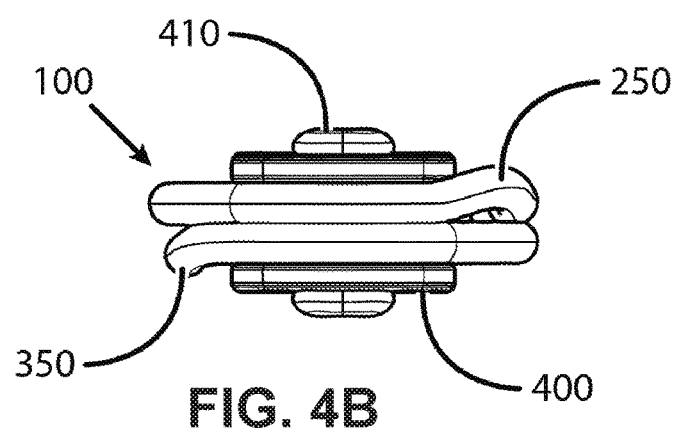
Figure 4C:
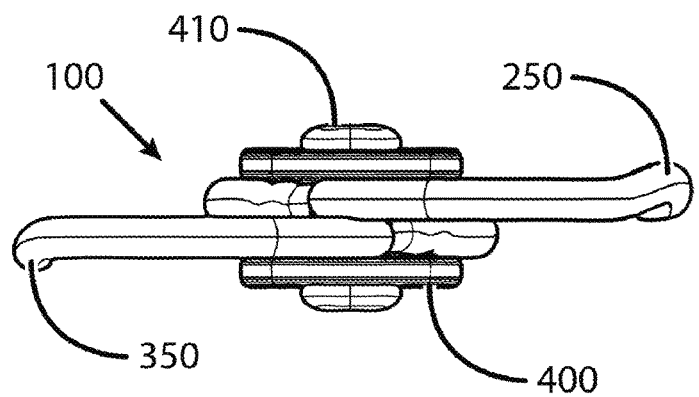
Figure 5A:
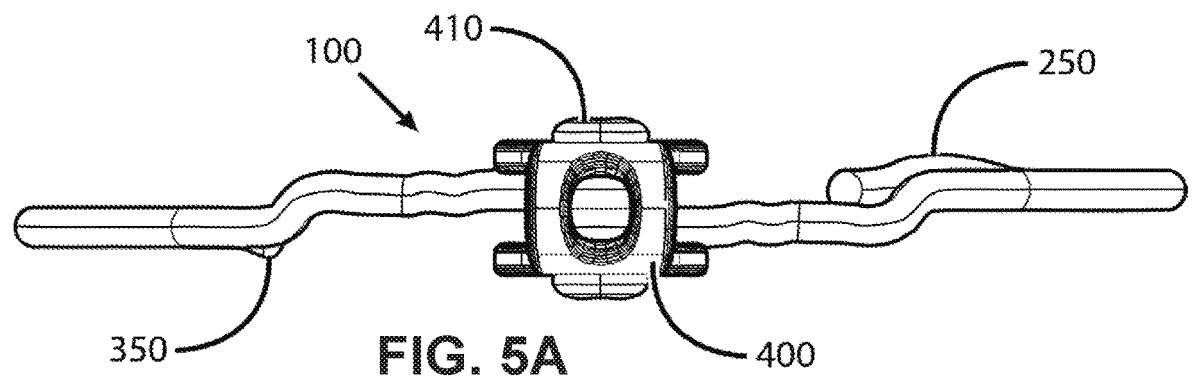
FIGS. 5A-5C show back views of the first embodiment in the opened, closed, and crossed configurations, respectively.
Figure 5B:
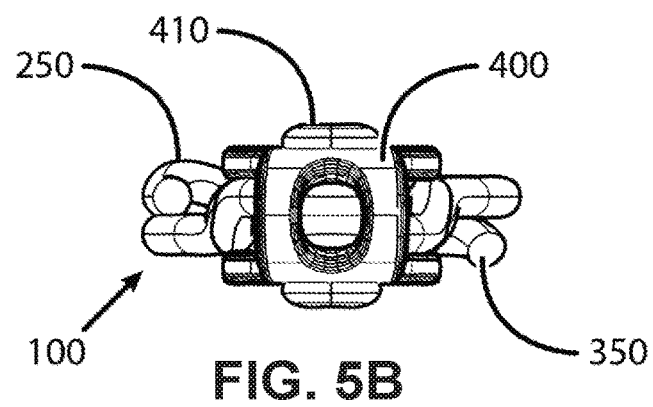
Figure 5C:
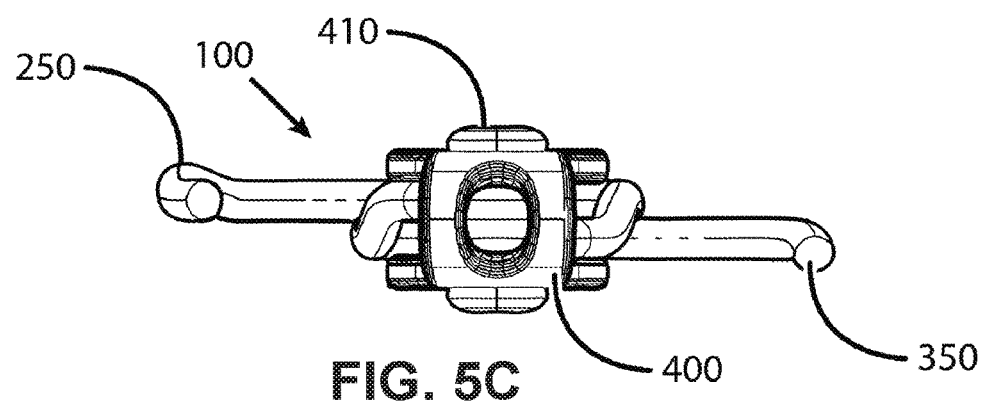
Figure 7A:
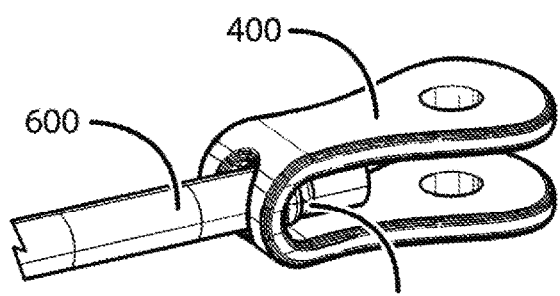
FIGS. 7A-7B show exemplary means to attach a cord to the base of the first embodiment.
Figure 7B:
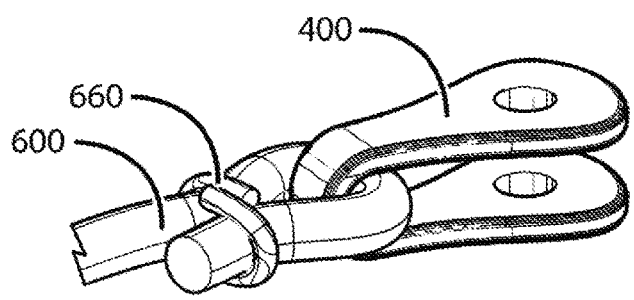

FIGS. 2A, 3A, and 4A show a first embodiment of the hook assembly 100 in an opened configuration; FIGS. 2B, 3B, and 4B show the first embodiment in a closed configuration; and FIGS. 2C, 3C, and 4C show the first embodiment in a crossed configuration. The hook assembly 100 comprises a pair of opposing hooks, referred to as deep hook 200 and shallow hook 300, each secured to a base 400 via a pivot joint. These hooks may have throats of equal or unequal depths; they may have gapes of equal or unequal sizes; and they may have shanks of equal or unequal lengths. The base 400 may be secured to a distal end or medial portion of a cord 600 in any suitable manner, for example via hole in the base 400 and a clasp 660 as shown in FIG. 7A or via a loop around the base 400 and a clasp 660 as shown in FIG. 7B. Additionally, a cord 600 may be molded within a plastic base 400 (not illustrated), or a base 400 may be permanently crimped or temporarily clamped or wedged onto a cord 600 (not illustrated). The base may be any member and any material suitable for securing a cord thereto and for contributing to a pivot joint, for example molded plastic, machined plastic, cast metal, fabricated metal (for example FIGS. 15A-17B), and bent wire (for example FIGS. 18A-18B).

Figure 6:
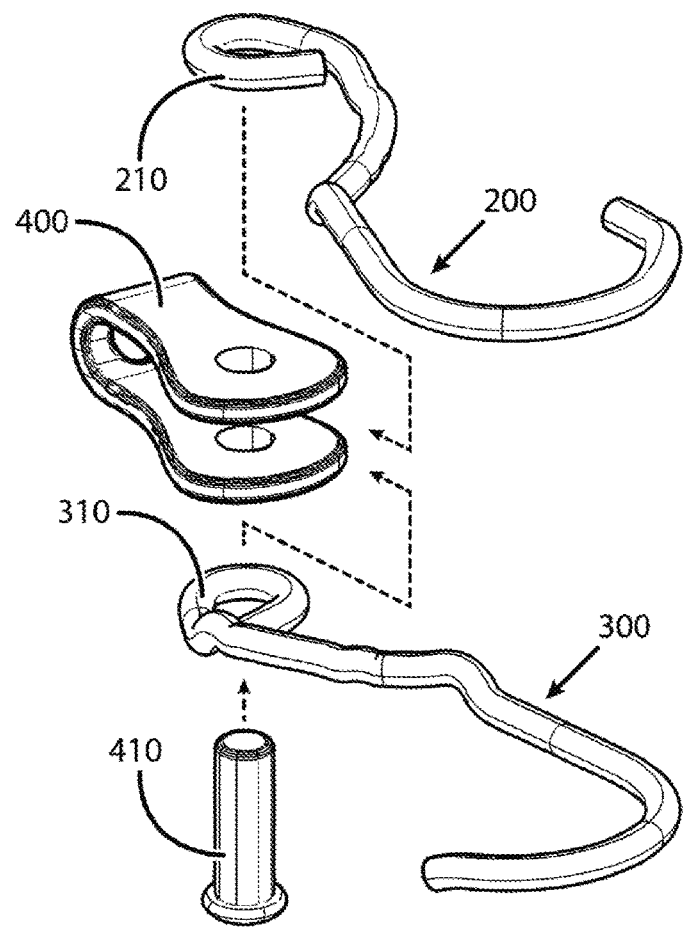
FIG. 6 shows an exploded view of the first embodiment.
Figure 19:
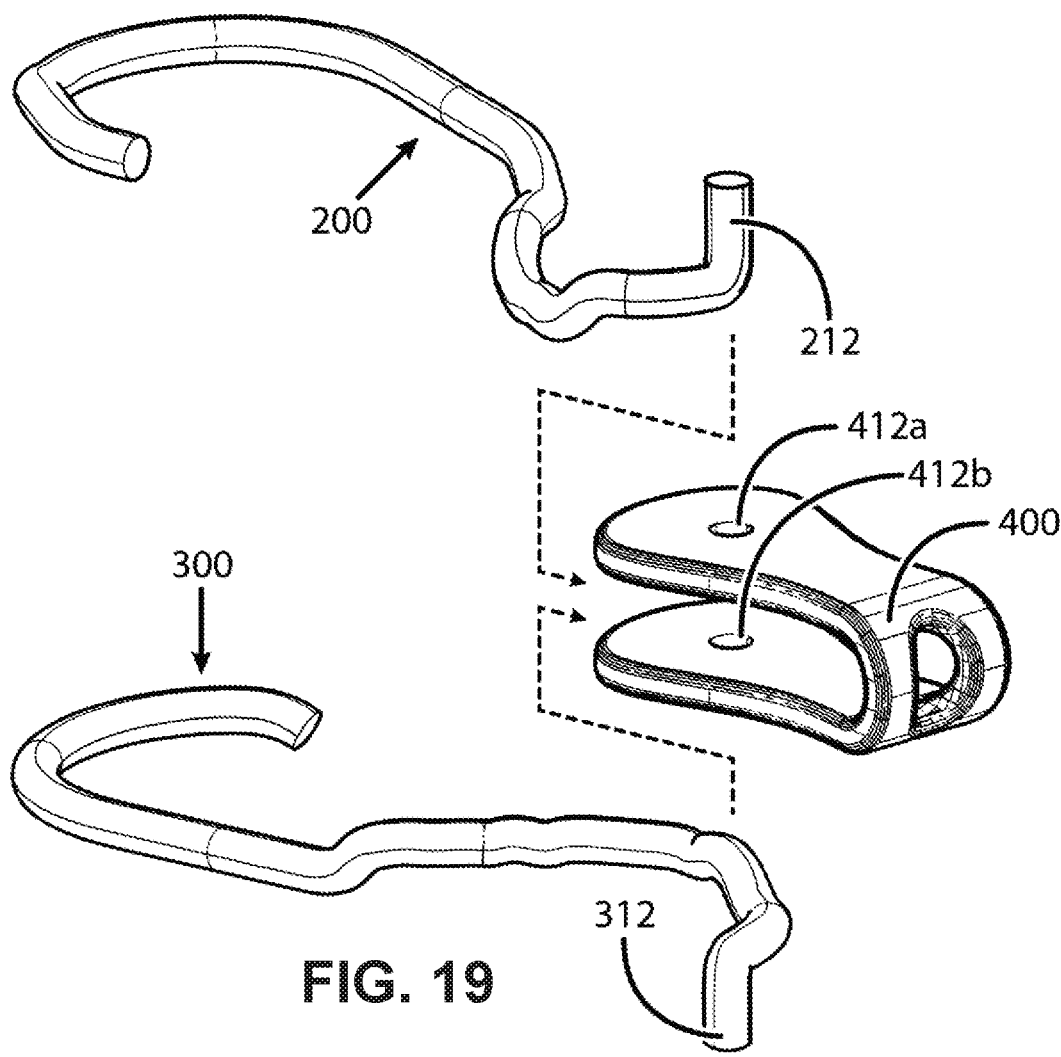
FIG. 19 shows an exploded view of an alternate method to form a pivot joint wherein the axle comprises integral portions of the hooks.
Figure 20:
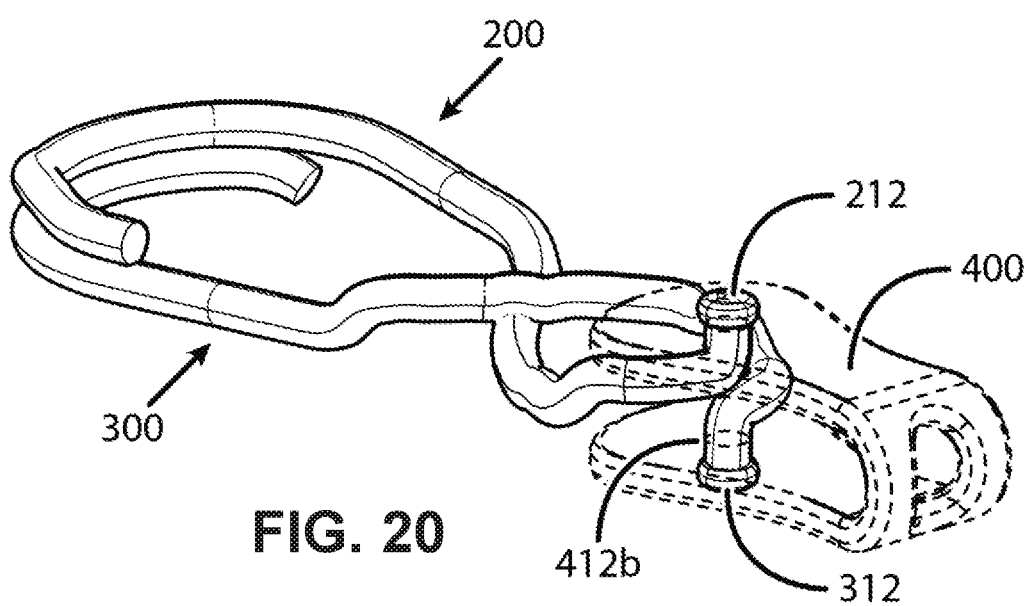
FIG. 20 shows this alternate method as an assembled hook assembly

As shown in FIG. 6, the pivot joint of the deep hook 200 comprises a sleeve 210 that loops around a pin 410, and the pivot joint of the shallow hook 300 comprises a sleeve 310 that also loops around the pin 410. These pivot joints are uniaxial and coaxial, which restricts rotation of deep hook 200 and the shallow hook 300 to parallel planes (hereafter simply referred to as the plane of rotation, collectively). The axle of each pivot joint need not comprise a pin 410 held by the base 400 as shown in FIGS. 2A-5C and FIG. 6. For example, the axle may be integrally formed onto the base 400 as shown in FIGS. 15A-16B. Such an integrated axle may comprise a single integrated pin 410c as shown in FIGS. 16A-16B or it may comprise a pair of integrated partial pins pin 410a and pin 410b as shown in FIGS. 17A-17B. Further, the relative locations of the components that contribute to each pivot joint may be swapped. For example, as shown in FIGS. 19-20, the pivot joint of the deep hook 200 may comprise a pin 212 defined on the deep hook 200 that inserts into a sleeve 412a defined on the base 400, and the pivot joint of the shallow hook 300 may comprise a pin 312 defined on the shallow hook 300 that inserts into a sleeve 412b defined on the base 400.

In this first embodiment there is a plurality of retainers located on the shank 220 of the deep hook 200 and there is a plurality of retainers located on the shank of the shallow shank 330 of the shallow hook. The retainers located on the deep hook 200 retain the shank 330 of the shallow hook, and the retainers located on the shallow hook 300 retain the shank 220 of the deep hook 200. Each retainer is defined on the surface of a given hook adjacent to the path of rotation of the shank of the other hook, and the retainer impedes rotation of that other hook relative to the given hook. Consequently, a retainer pauses a rotating hook at a predetermined angle relative to the other hook, thereby creating a particular discrete configuration of the hook assembly 100. In particular, there may be three retainers defined on the deep hook 200: the retainer 230 retains the shallow hook 300 in its opened position; the retainer 232 retains the shallow hook 300 in its closed position; and the retainer 234 retains the shallow hook 300 in its crossed position. Similarly, there may be three retainers defined on the shallow hook 300: the retainer 320 retains the deep hook 200 in its opened position; the retainer 322 retains the deep hook 200 in its closed position; and the retainer 324 retains the deep hook 200 in its crossed position. There may be greater or fewer than three retainers per hook.

Figure 8A:
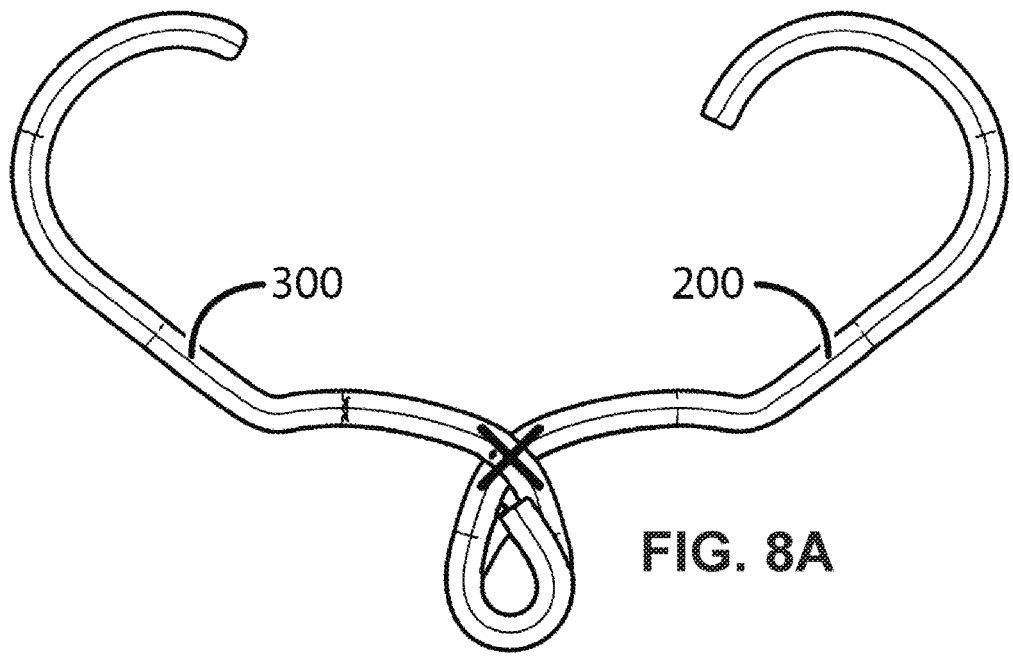
FIG. 8A-8C show a top view of the hooks crossing each other in the opened, closed, and crossed configurations, respectively.
Figure 8B:
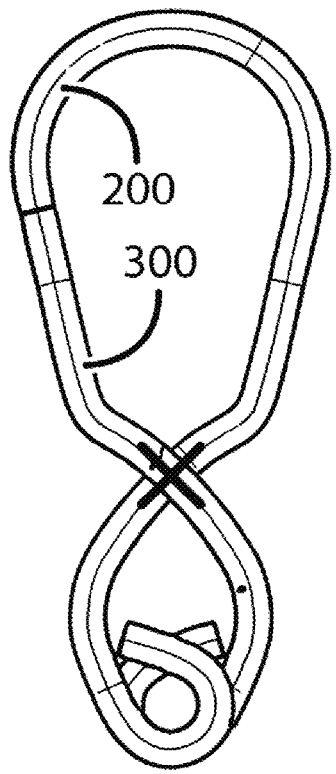
Figure 8C:
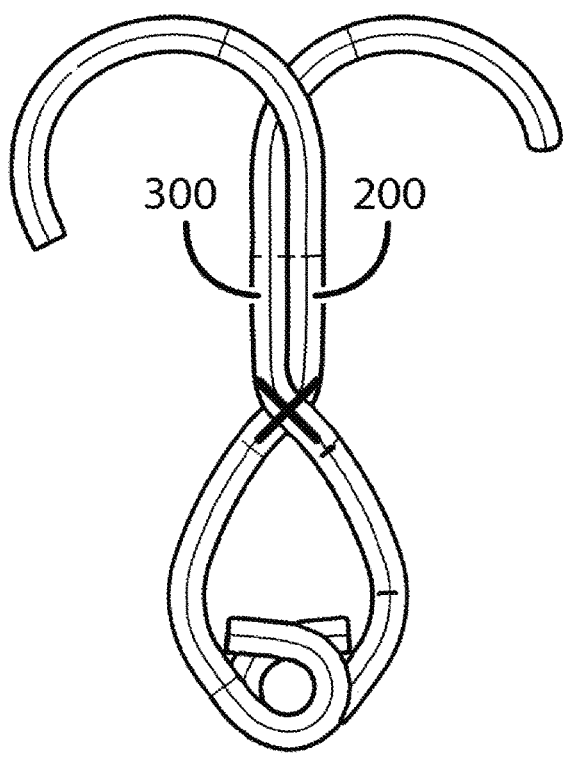

FIGS. 8A-8C illustrate the crossing of the shank 220 of the deep hook 200 with the shank 330 of the shallow hook. The segment of each shank comprising the retainers may be appropriately curved so that in any of the predetermined configurations of the hook assembly 100 the shanks cross at approximately 90 degrees to each other, indicated by an "X" in FIGS. 8A-8C.

Figure 9A:
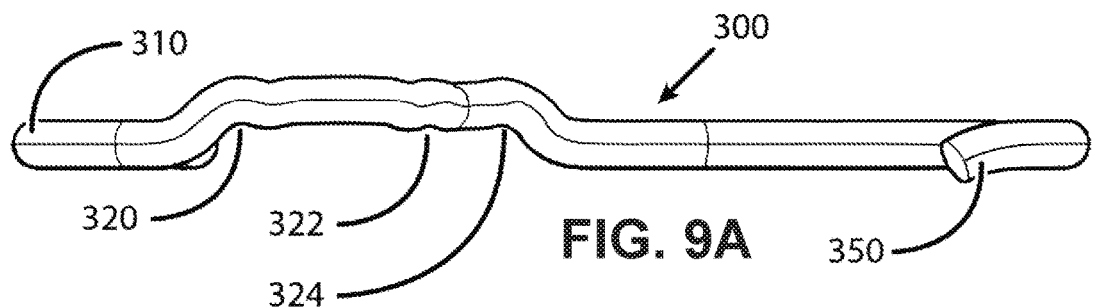
FIG. 9A shows a side view of the retainers defined on a first hook and FIG. 9B shows a cartoon representation of these retainers.
Figure 9B:
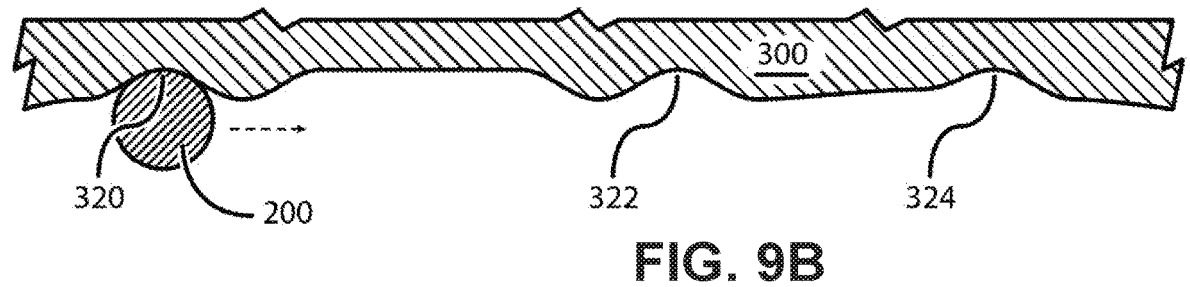
Figure 10A:
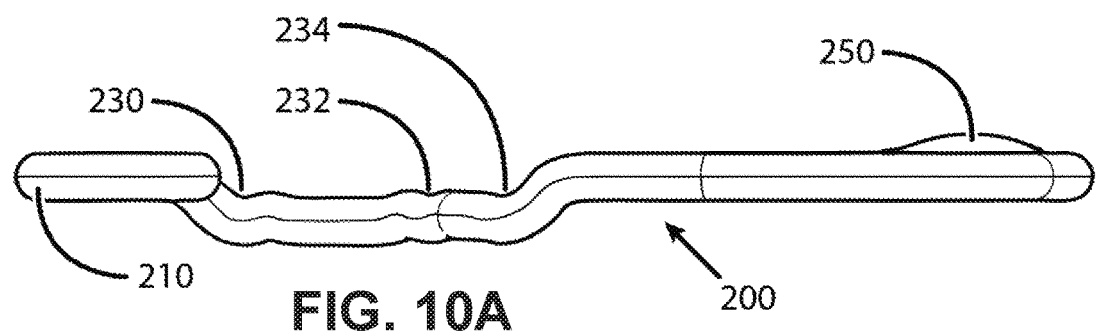
FIG. 10A shows a side view of the retainers defined on a second hook and FIG. 10B shows a cartoon representation of these retainers.
Figure 10B:
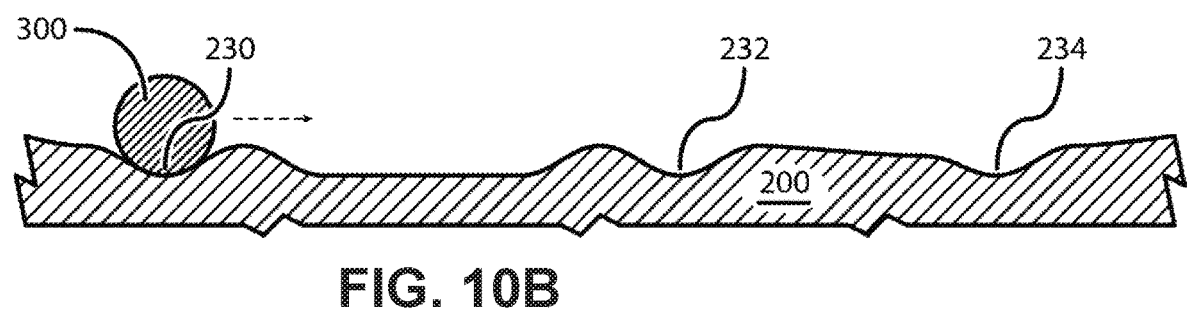

FIG. 9B shows a cartoon profile of the retainers of the deep hook 200 shown in FIG. 9A, and FIG. 10B shows a cartoon profile of the retainers of the shallow hook 300 shown in FIG. 10A. These cartoon profiles are exemplary and are not drawn to scale. The retainer profile on the deep hook 200 may or may not be a mirror image of the retainer profile on the shallow hook 300. Further, for a given retainer profile, the distance between retainers, the depth of each retainer, and whether the space between retainers is filled with or void of material may vary to produce a hook assembly 100 having a desired function and feel when transitioning between the different configurations.

In general, a retainer that is deep or has steep walls impedes the movement of the shank of a hook with greater resistance than does a retainer that is shallow or has gradual walls. For example, when the hook assembly 100 transitions from the opened to closed configuration, the shank 220 of the deep hook 200 must overcome the wall of the retainer for opened position 320 in the direction of the dotted arrow shown in FIG. 9B. Overcoming this wall requires the shank 220 of the deep hook 200 to deflect from the plane of rotation in conflict with the axis of the pivot joint. A greater axial conflict results in a greater resistive force.

In the exemplary profile of FIG. 9B there is a large separation between the retainer for opened position 320 and the retainer for closed position 322. A larger distance corresponds to a wider opening when the hook assembly 100 is in the opened configuration (large gap between the bends of the hooks), which helps the hook assembly 100 to enclose around large objects. Between the retainer for opened position 320 and the retainer for closed position 322 there is a "dead zone" in which the shank 220 of the deep hook 200 may rotate without deflection from the plane of rotation. This optional dead zone helps to prevent a distal end of the deep hook 200 from deflecting out of the plane of rotation and crisscrossing a distal end of the shallow hook 300 when the bends of the hooks begin to overlap during the transition of the hook assembly 100 from the opened to closed configuration.

There need not be a dead zone between adjacent retainers of a surface; instead there may be an elevated region as shown between the retainer for closed position 322 and the retainer for crossed position 324 in FIG. 9B. Because the bends of the hooks overlap in the closed configuration, there is no risk that distal ends of the hooks crisscross when transitioning away from this configuration. This elevated region deflects the shank 220 of the deep hook 200 out of the plane of rotation and therefore creates a perpendicular force (and friction) against the deep hook 200 during the transition between the closed and crossed configurations. This elevated region may be sloped towards the retainer for crossed position 324 to bias the shank 220 of the deep hook 200 towards the retainer for crossed position 324 once that shank overcomes the wall of the retainer for closed position 322 in the direction of the dotted arrow.

Figure 11:
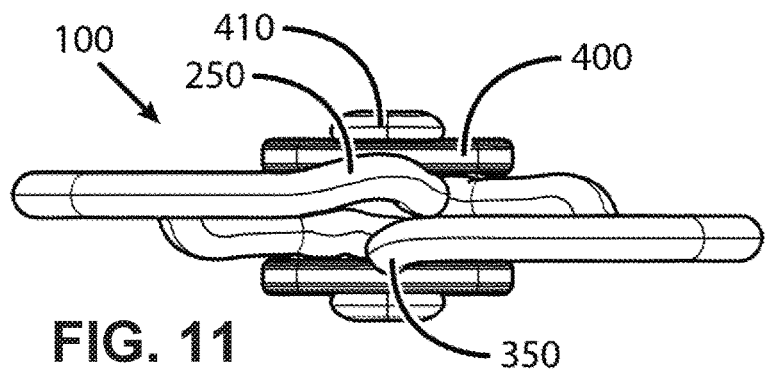
FIG. 11 shows a front view of the hook assembly transitioning from the opened to closed configuration wherein the distal protrusions on each hook are adjacent to each other.

FIG. 11 shows the hook assembly 100 during the transition from the opened to closed configuration. To help prevent the bends from crisscrossing during this transition, a portion of the distal end of the deep hook 200 may define a protrusion 250 that protrudes out of the plane of rotation away from the shallow hook 300. Similarly, a portion of the distal end of the shallow hook 300 may define a protrusion 350 that protrude out of the plane of rotation away from the deep hook 200.

Figure 12A:
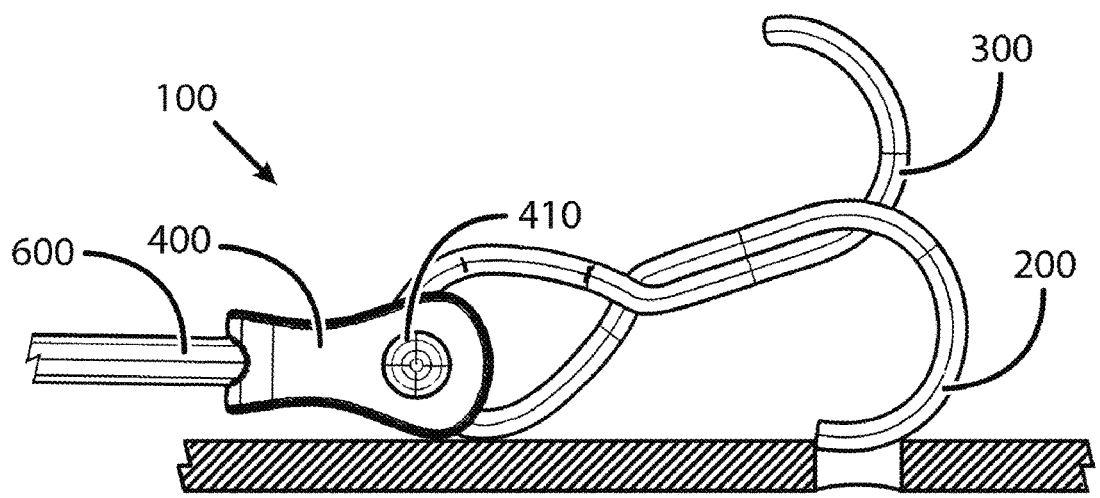
FIG. 12A shows a first hook having a deep throat unable to insert into a small hole.
Figure 12B:
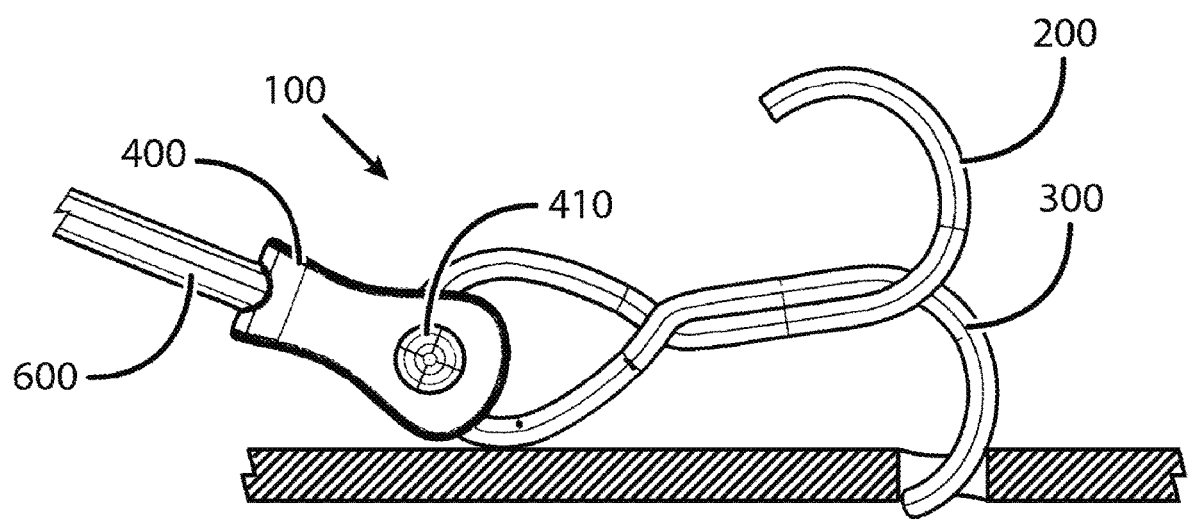
FIGS. 12B-12D show a second hook having a shallow throat that is able to be inserted into the small hole.
Figure 12C:
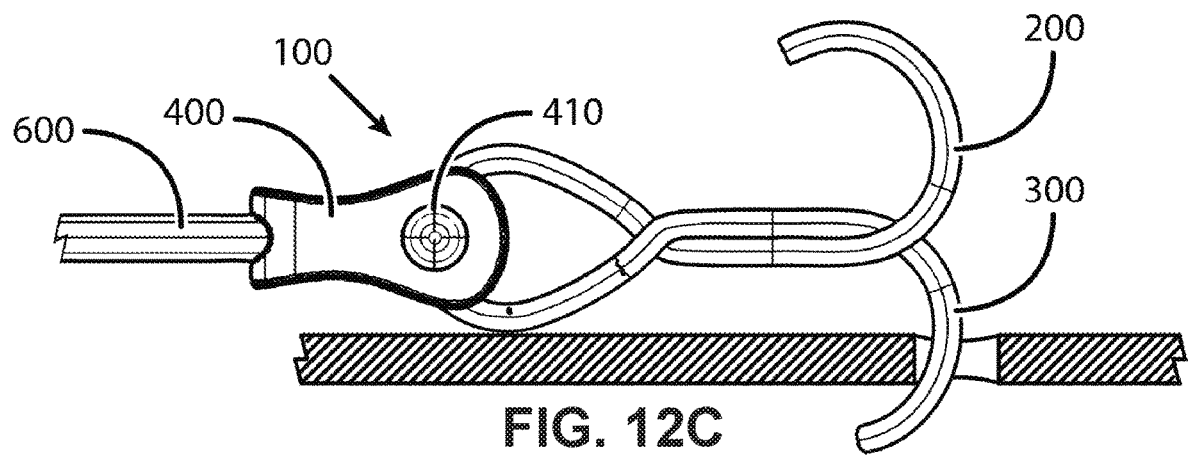
Figure 12D:
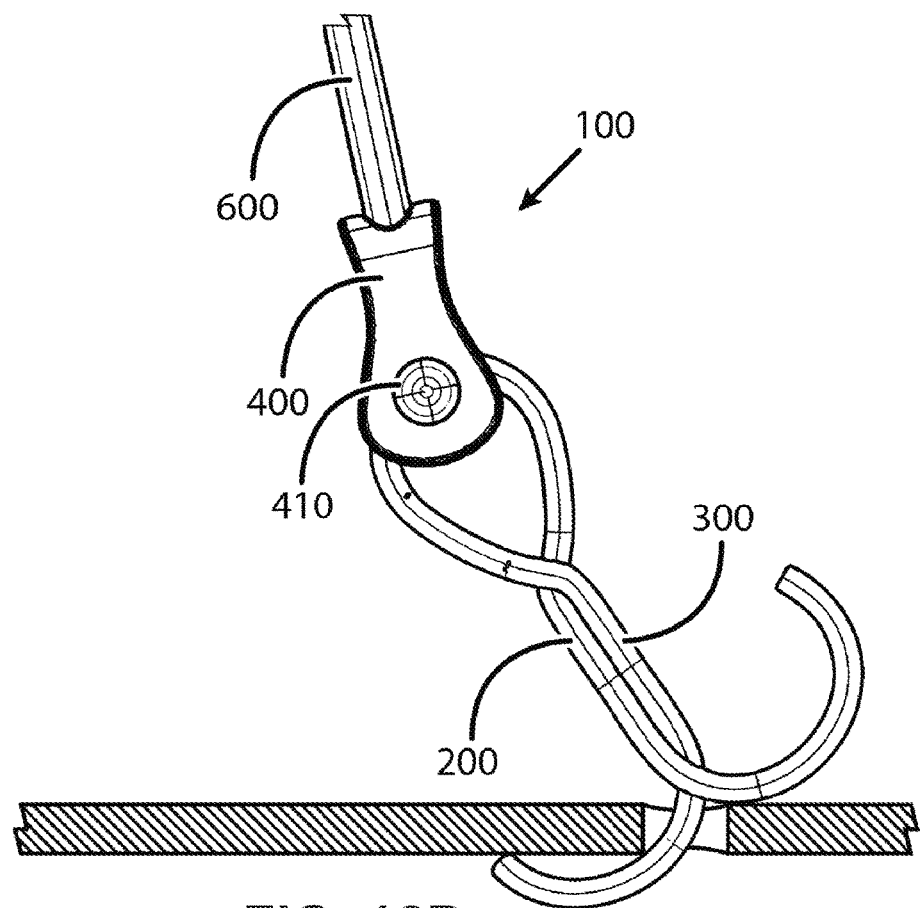
Figure 13A:
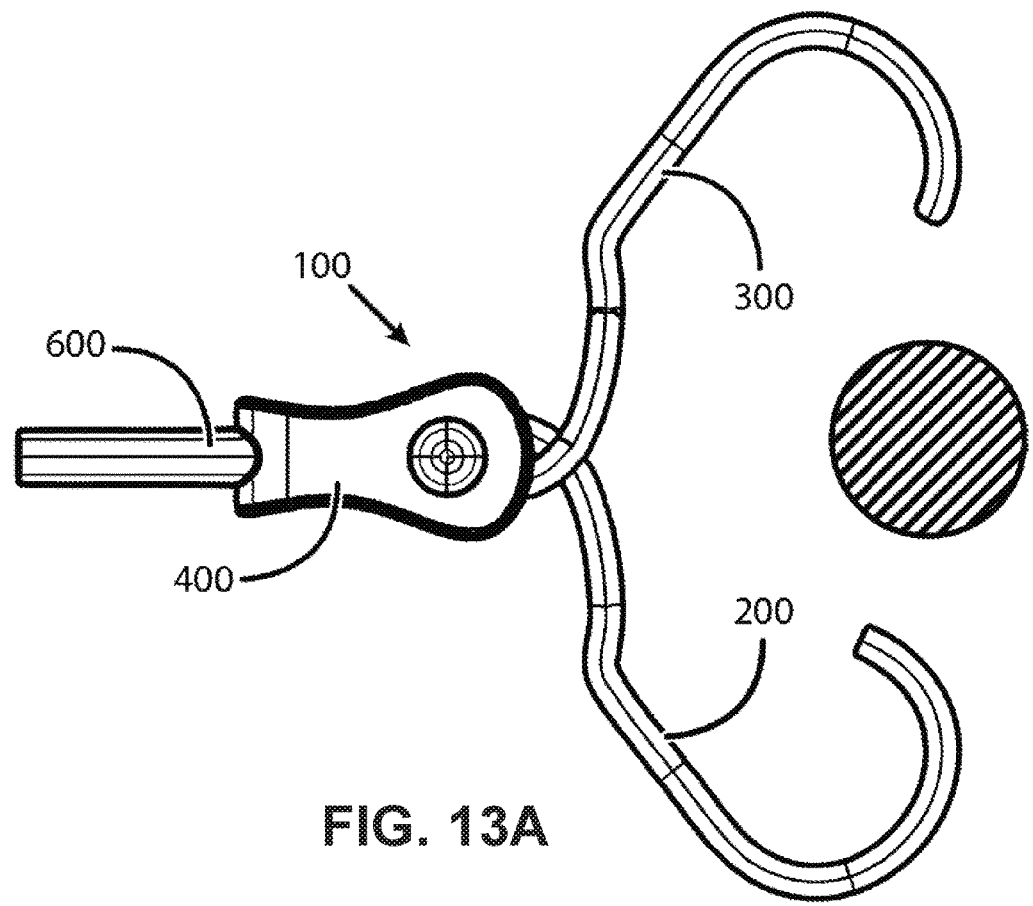
FIGS. 13A-13D show the first embodiment closing around an object.
Figure 13B:
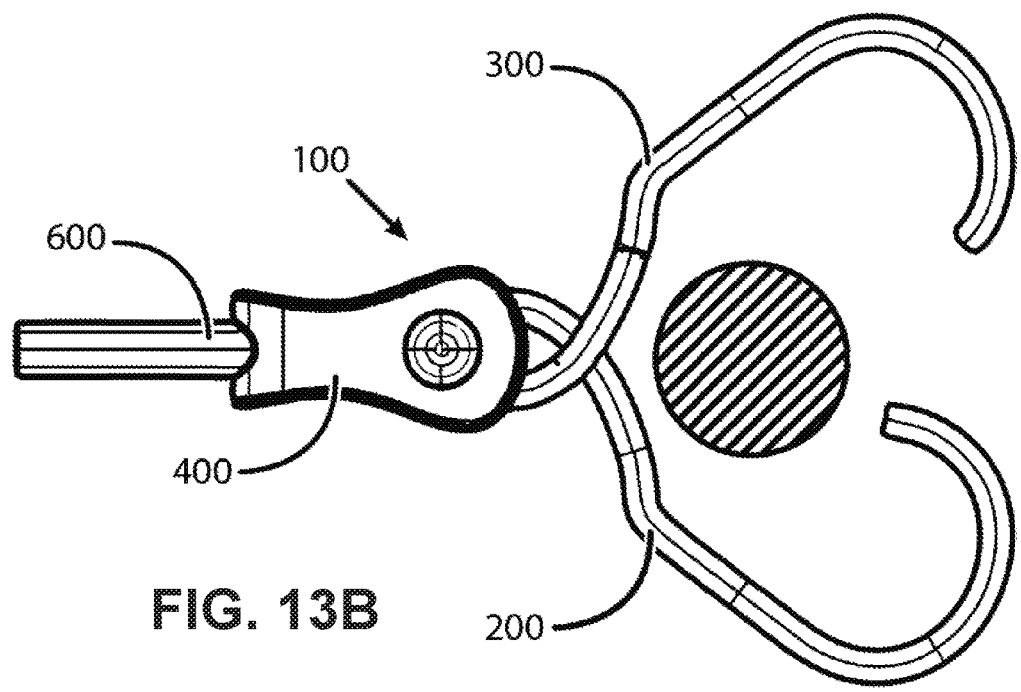
Figure 13C:
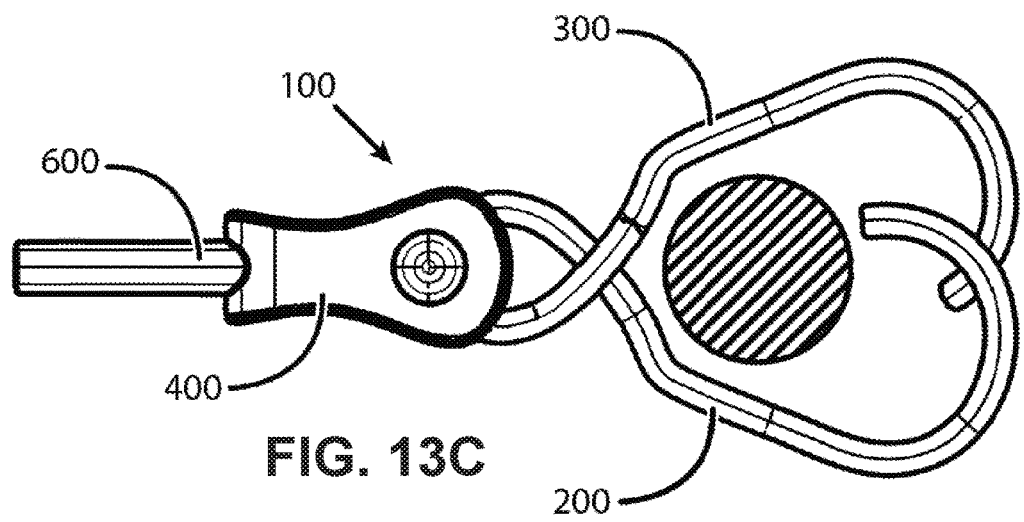
Figure 13D:
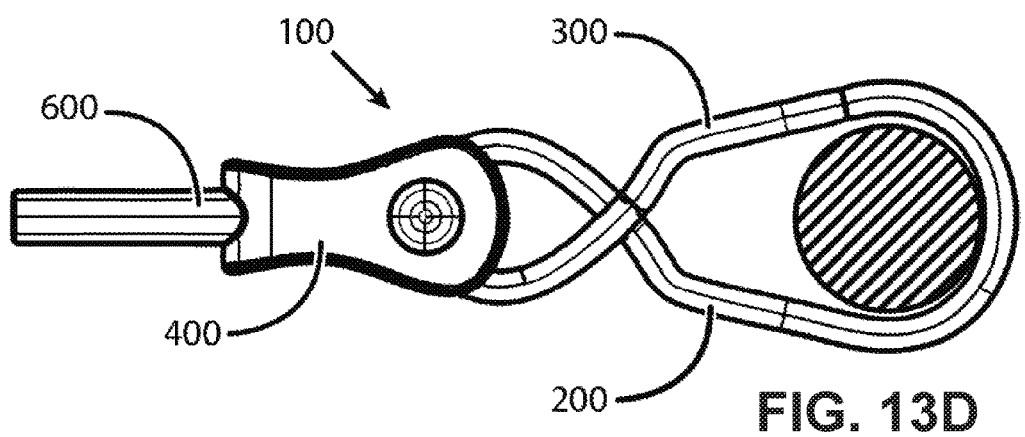
Figure 14:
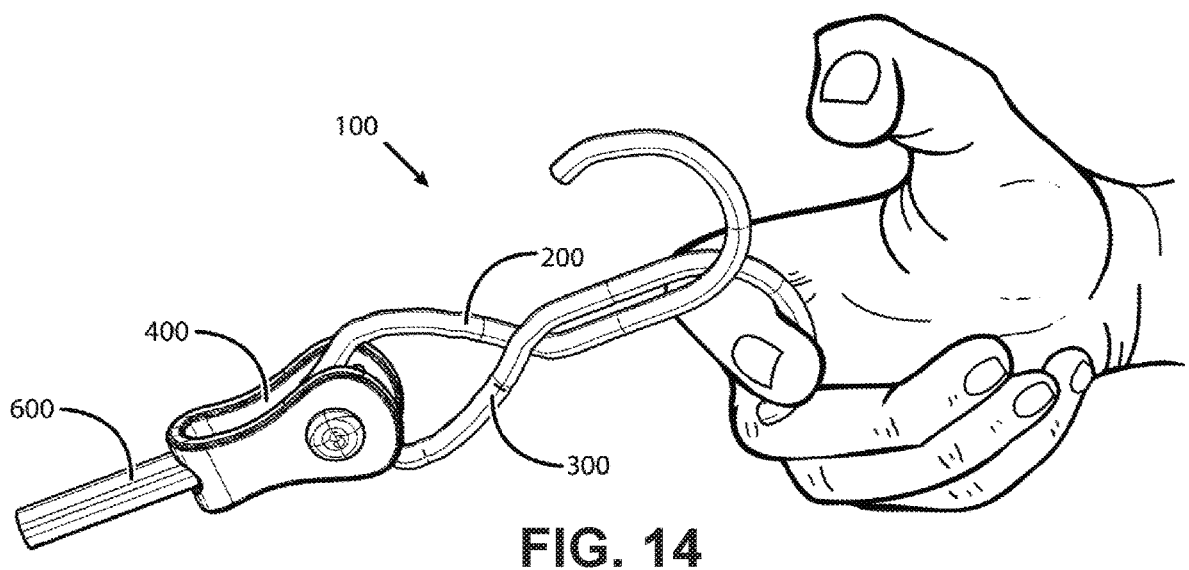
FIG. 14 shows a finger pulling on a first hook of the first embodiment in the crossed configuration.

FIGS. 12A-12D illustrate a benefit of the optional feature of defining a shallower throat on the shallow hook 300 relative to the throat of the deep hook 200. A deep throat may prevent the bend of a hook from being inserted into a narrow opening as shown in FIG. 12A. In contrast, a shallow throat may be easily inserted into the same narrow hole as shown in FIGS. 12B-12D. Practically all bungee cord hooks have deep throats because it is more common to attach a hook around an object than inserting a hook into a hole. However, because the hook assembly 100 comprises a pair of hooks, it may provide both deep- and shallow-throat hooks without any loss of functionality. In fact, providing both throat depths makes the hook assembly 100 more versatile.

FIGS. 13A-13D show the hook assembly 100 enclosing around an object. The hook assembly 100 starts in the opened configuration shown in FIG. 13A and ends up in the closed configuration shown in FIG. 13D. In this first embodiment the intermediate positions of the hooks in FIGS. 13B-13C do not correspond to configurations determined by any retainers.

FIG. 13 illustrates a benefit of the crossed configuration. In this example a user may curl a finger around the shallow hook 300, pull the hook assembly 100 to the desired location, and attach the hook assembly 100 to an object using the deep hook 200. Either hook may serve as a pull tab.

Locating retainers on the shank 220 of the deep hook 200 and the shank 330 of the shallow hook may contribute to several benefits, for example minimal part count or ease of manufacturing. Further, the hook assembly 100 may be easy to use because each predetermined configuration is defined only by the rotational angle between the hooks rather than defined by both the rotational angle between the hooks and the rotational angle between each hook and some other member. However, the retainers may be located on any other member, for example on the base or on an additional member. FIGS. 21A-23C illustrate a second embodiment of the hook assembly 100 wherein the retainers are located on a panel 500 that is sandwiched between the deep hook 200 and the shallow hook 300, and FIGS. 24A-27C illustrate a third embodiment wherein the retainers are located on the base 400. Further embodiments exist that are not illustrated, such as distributing the retainers among several members. For example, given three retainers that retain a deep hook 200, a first retainer may be disposed on a shallow hook 300, a second retainer may be disposed on a panel 500, and a third retainer may be disposed on a base 400.

Figure 21A:
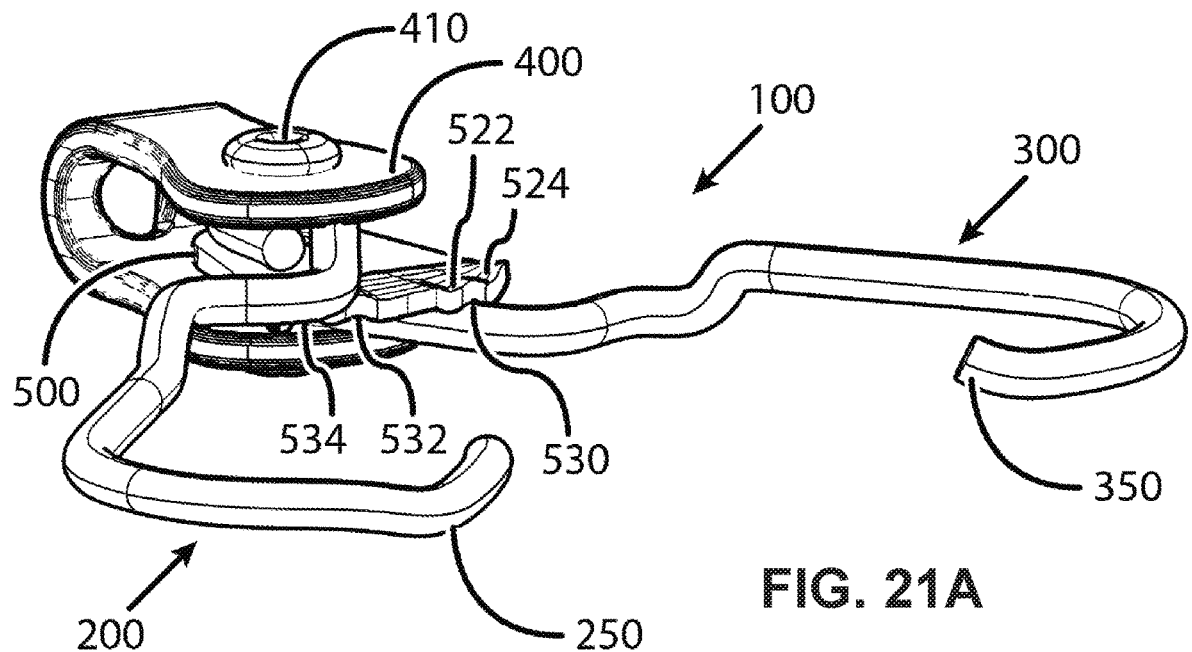
FIGS. 21A-21C show perspective views of a second embodiment in opened, closed, and crossed configurations, respectively.
Figure 21B:
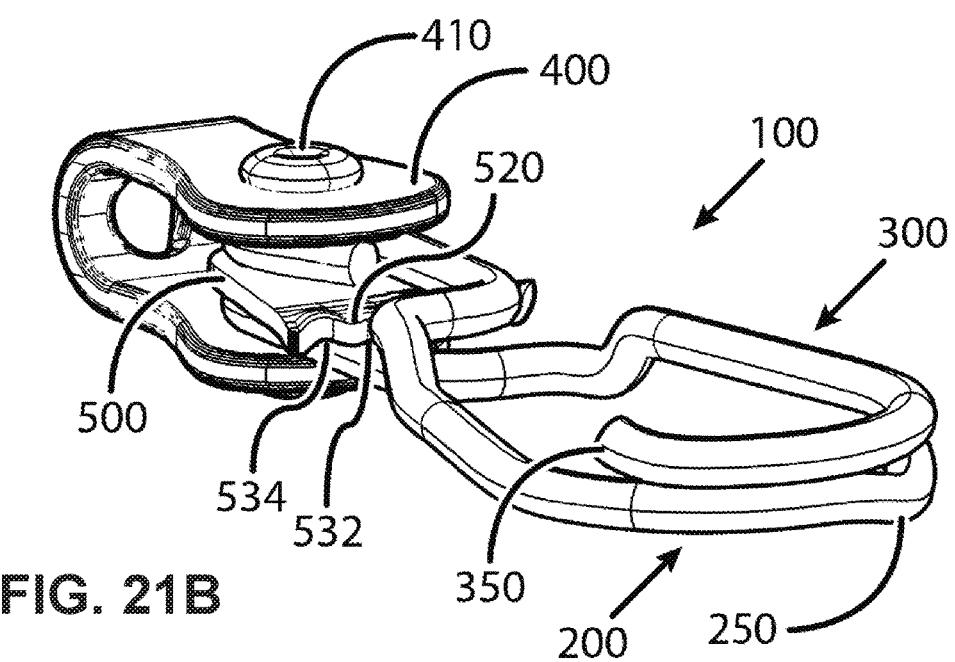
Figure 21C:
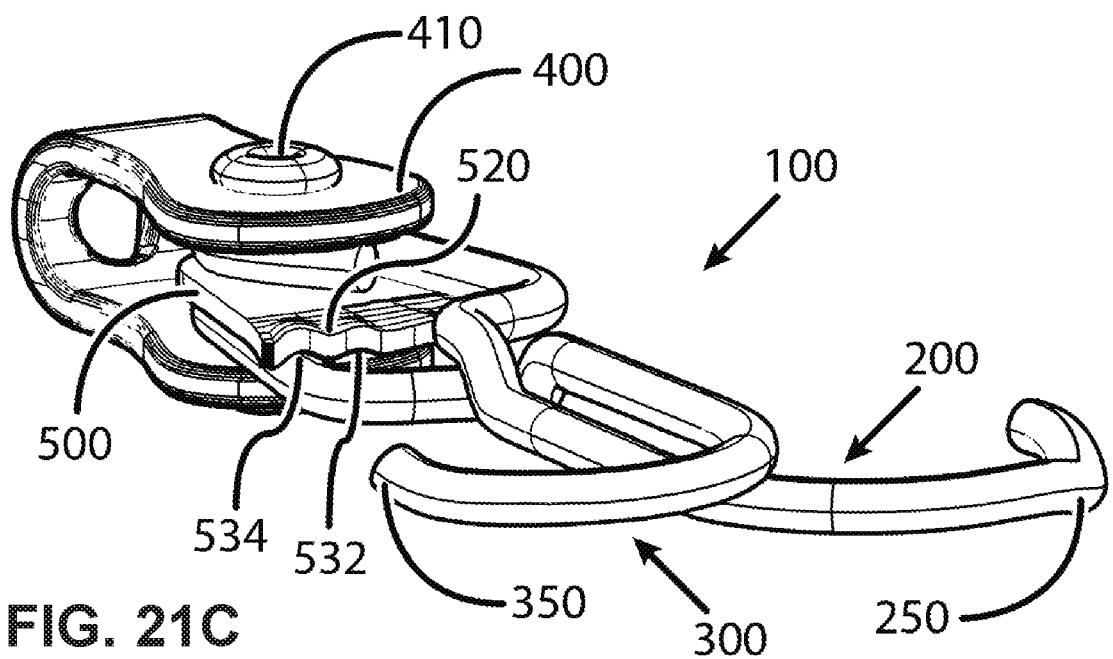
Figure 22:
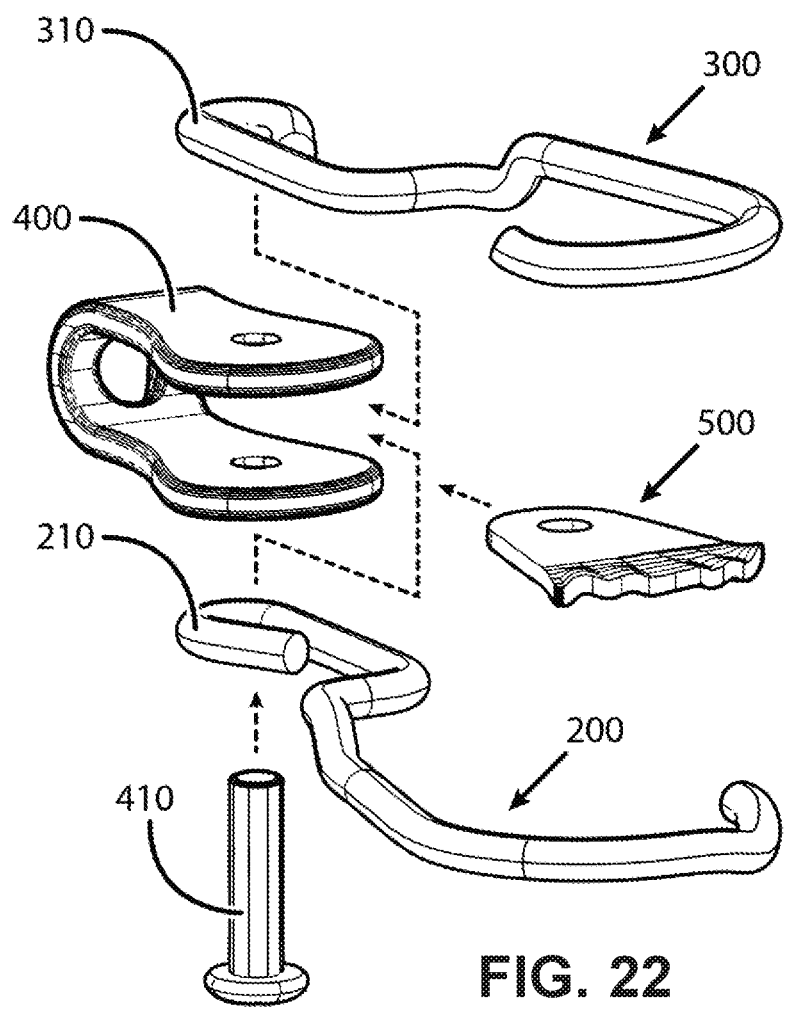
FIG. 22 shows an exploded view of the second embodiment.

FIGS. 21A-21C show the retainers located on a panel 500 sandwiched between the deep hook 200 and the shallow hook 300. The retainer for opened position 520 retains the deep hook 200 in the opened configuration; the retainer for closed position 522 retains the deep hook 200 in the closed configuration; and the retainer for crossed position 524 retains the deep hook 200 in the crossed configuration. Similarly, the retainer for opened position 530 retains the shallow hook 300 in the opened configuration; the retainer for closed position 532 retains the shallow hook 300 in the closed configuration; and the retainer for crossed position 534 retains the shallow hook 300 in the crossed configuration.

The panel 500 may be secured to the base 400 via a pivot joint comprising the sleeve 510 and the pin 410. Rotation of the panel 500, while not necessary, does enable the hooks to maintain a given configuration while rotating relative to the base, for example maintaining the crossed configuration as shown in FIG. 12A. The hook assembly 100 may include multiple panels, for example a panel 500 sandwiched between the deep hook 200 and the base 400 and a panel 500 sandwiched between the shallow hook 300 and the base 400 (not illustrated).

Figure 23B:
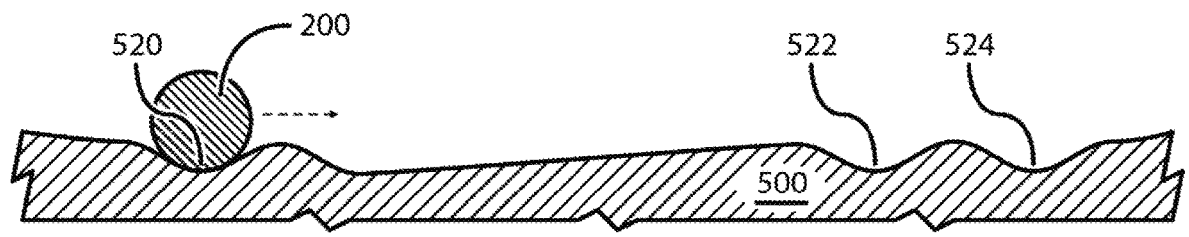
FIG. 23A shows a perspective view of the retainers defined on a panel and FIGS. 23B-23C show cartoon representations of these retainers.
Figure 23A:
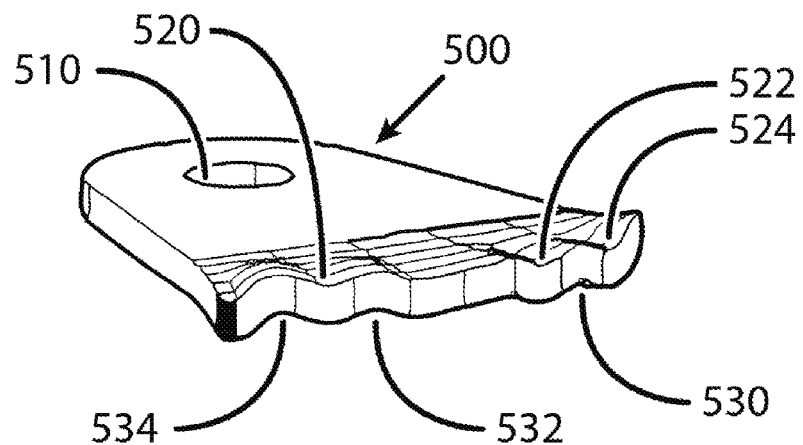
Figure 23C:
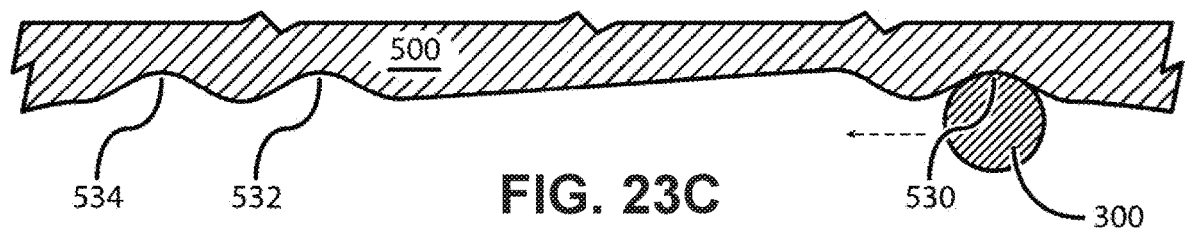

FIG. 23A shows a close-up of the retainers of the panel 500. FIG. 23B shows a cartoon profile of the retainers that retain the deep hook 200 and FIG. 23C shows a cartoon profile of the retainers that retain the shallow hook 300. These cartoon profiles are exemplary and are not drawn to scale. The function of these retainers is similar to those of the first embodiment described above.

Figure 24A:
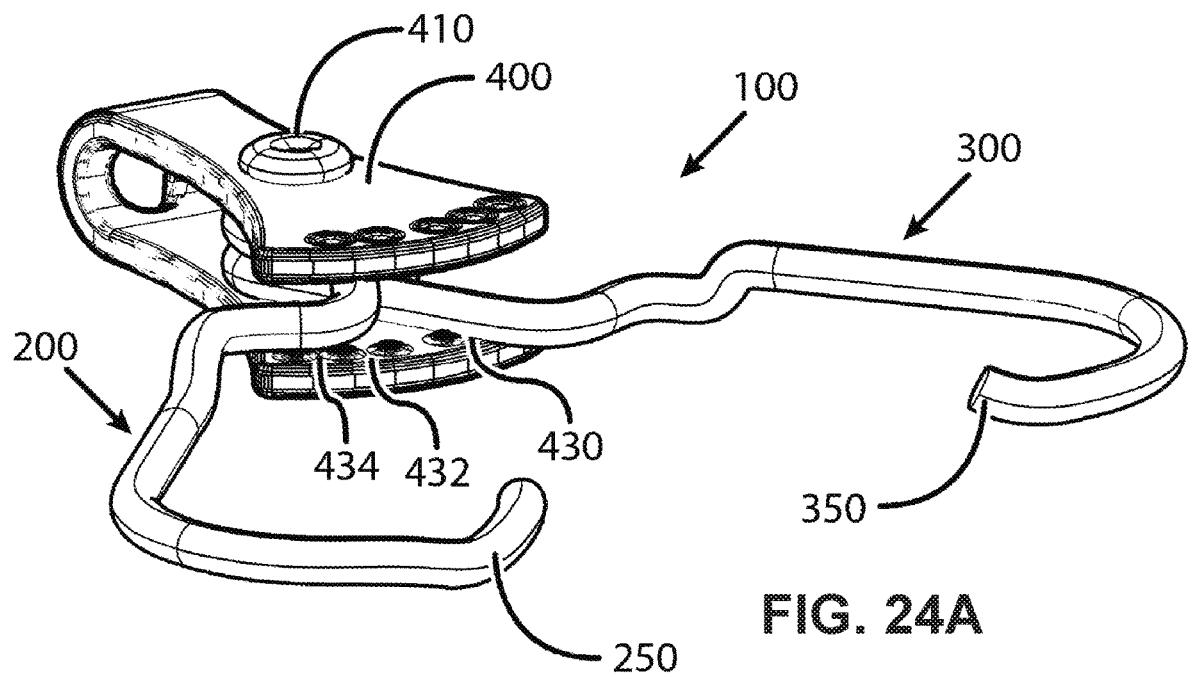
FIGS. 24A-24C show perspective views of a third embodiment in opened, closed, and crossed configurations, respectively.
Figure 24B:
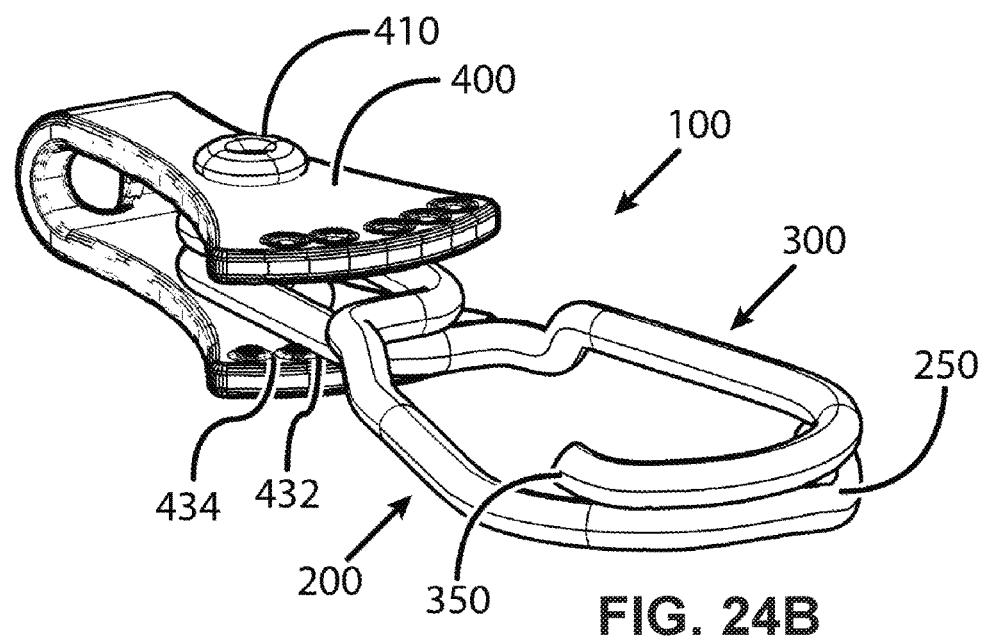
Figure 24C:
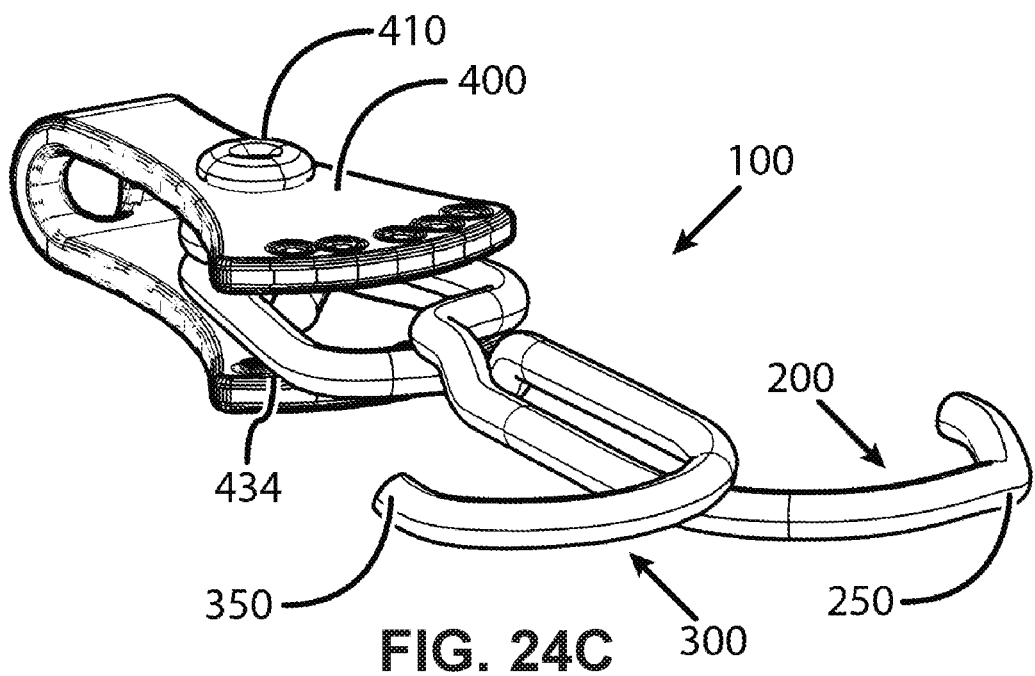
Figure 25:
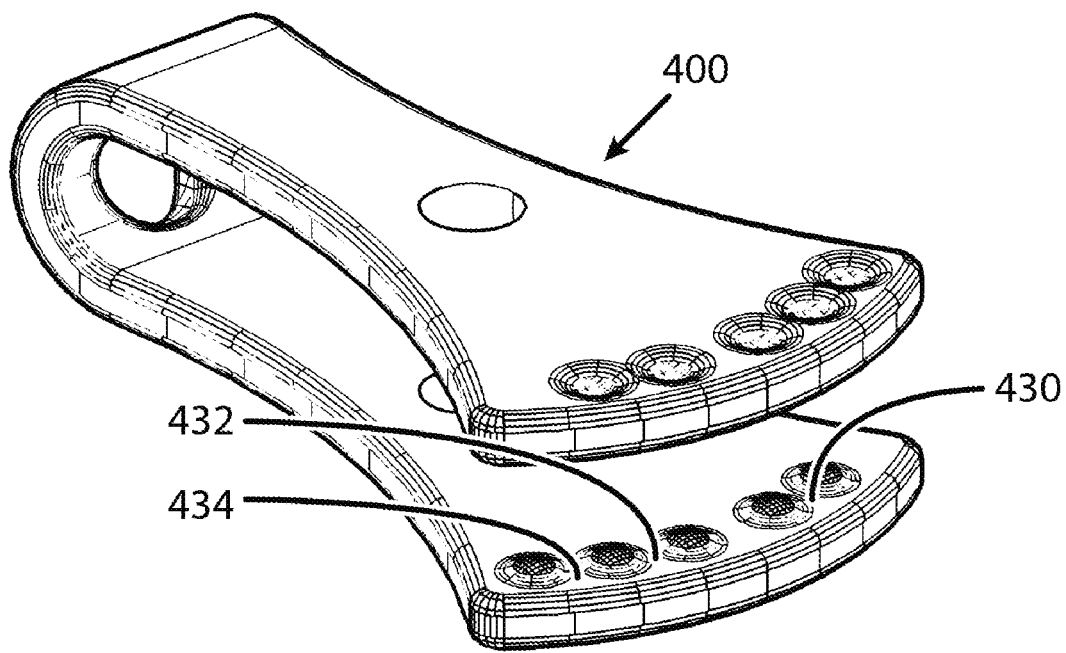
FIG. 25 shows an exemplary base of the third embodiment.
Figure 27A:
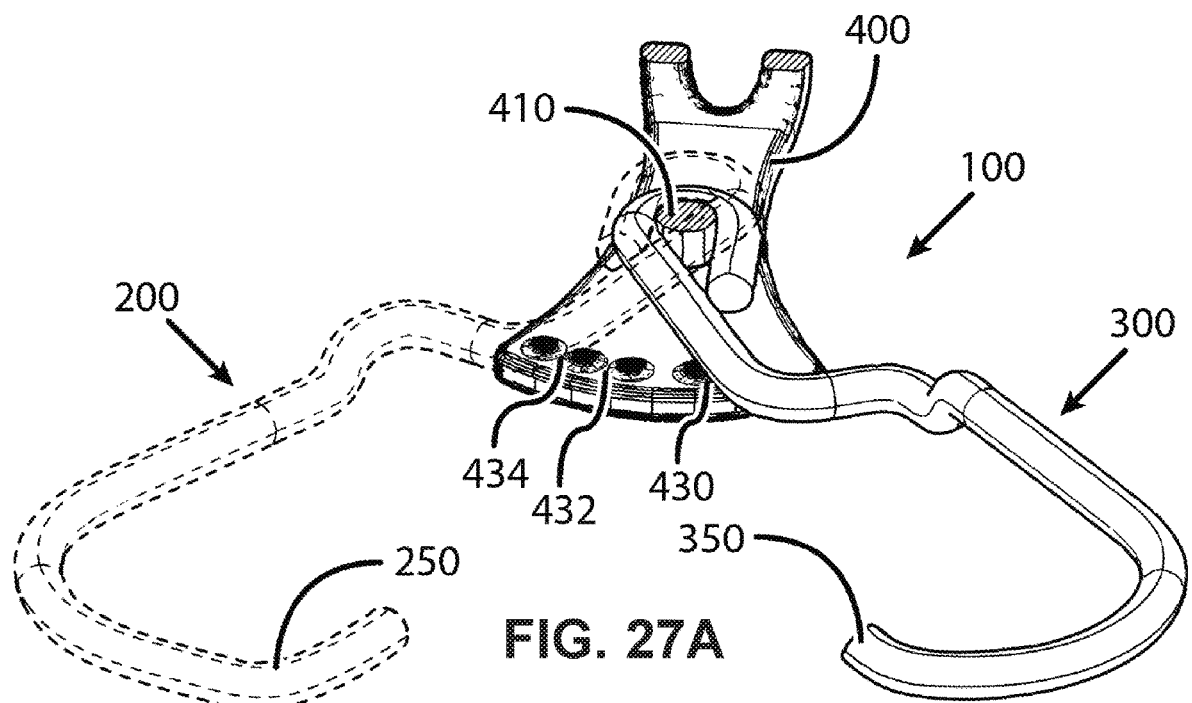
FIGS. 27A-27C show perspective cutaway views of the third embodiment in the opened, closed, and crossed configurations, respectively.
Figure 27B:
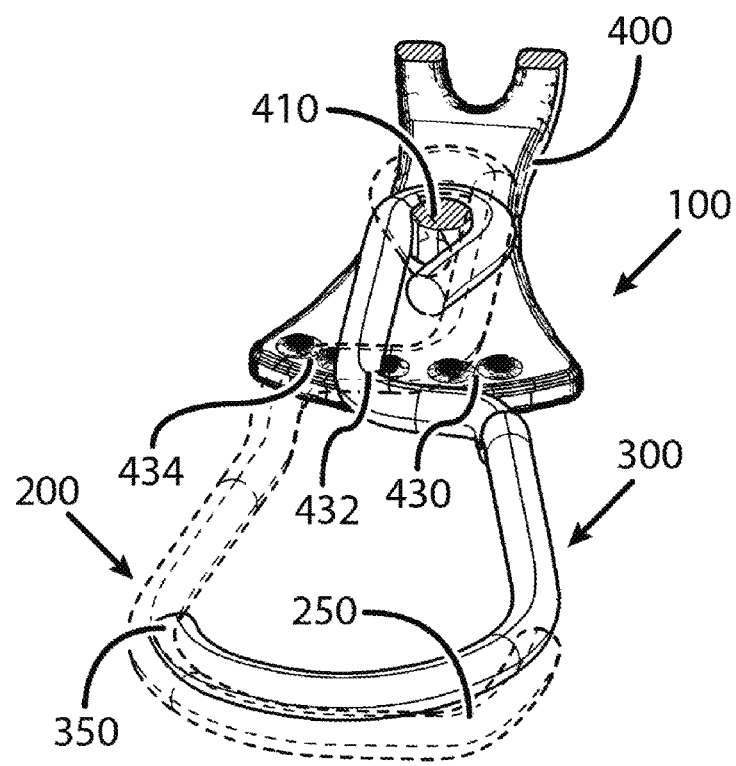
Figure 27C:
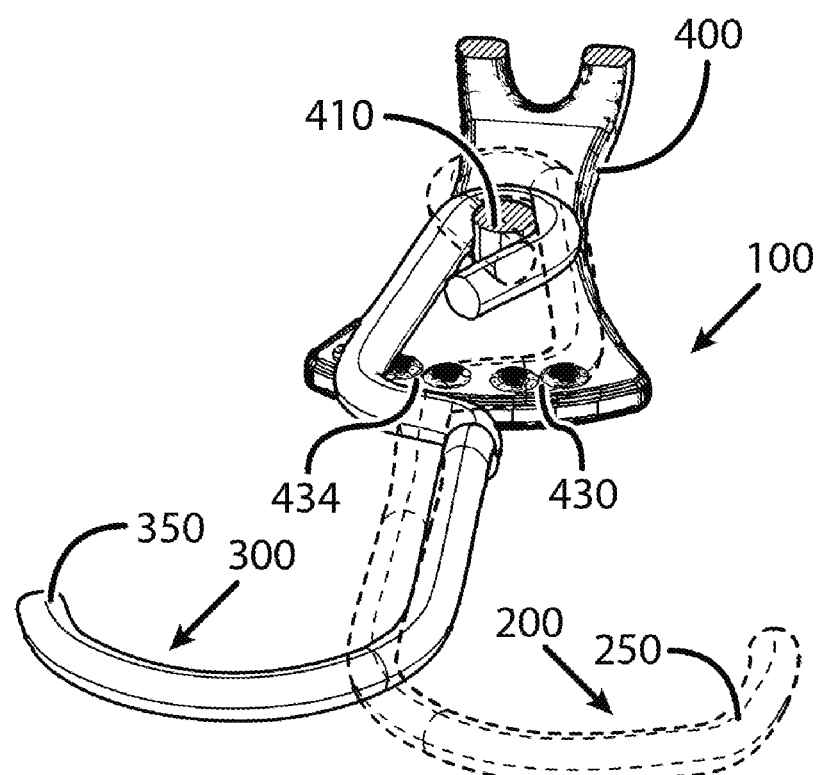

FIGS. 24A-24C show the hook assembly 100 having the retainers located on the base 400 and FIGS. 27A-27C show cutaway views thereof. The retainer for opened position 420 retains the deep hook 200 in the opened configuration; the retainer for closed position 422 retains the deep hook 200 in the closed configuration; and the retainer for crossed position 424 retains the deep hook 200 in the crossed configuration. Similarly, the retainer for opened position 430 retains the shallow hook 300 in the opened configuration; the retainer for closed position 432 retains the shallow hook 300 in the closed configuration; and the retainer for crossed position 434 retains the shallow hook 300 in the crossed configuration.

Figure 26B:
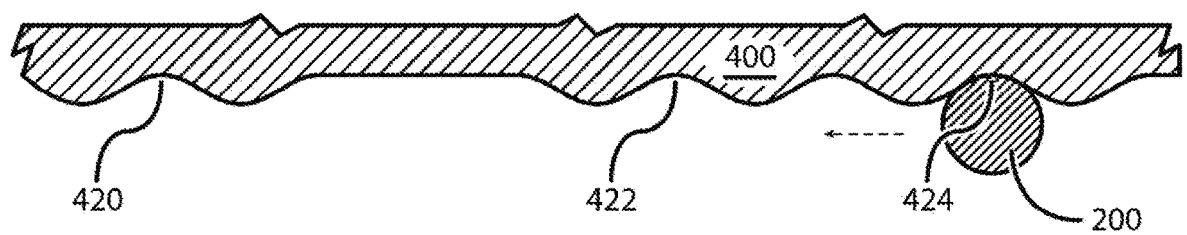
FIG. 26A shows a perspective view of the retainers defined on the base and FIGS. 26B-26C show cartoon representations of these retainers.
Figure 26A:
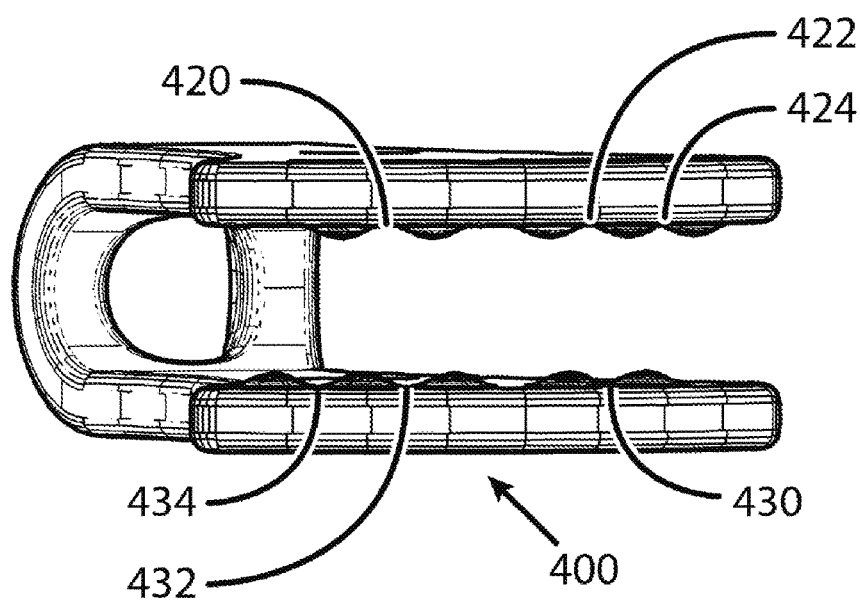
Figure 26C:
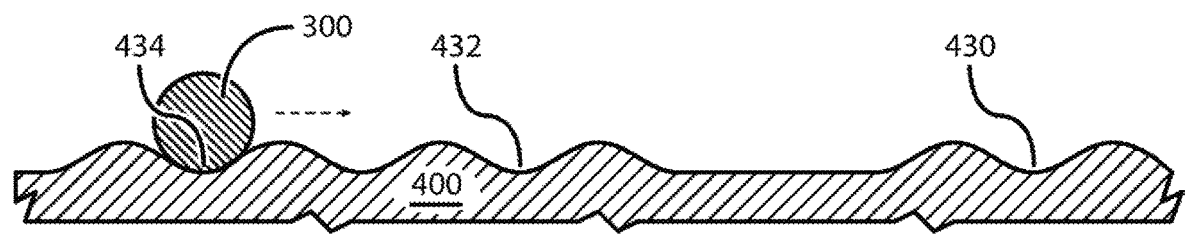

FIG. 26A shows a close-up of the retainers of the base 400. FIG. 26B shows a cartoon profile of the retainers that retain the deep hook 200 and FIG. 26C shows a cartoon profile of the retainers that retain the shallow hook 300. These cartoon profiles are exemplary and are not drawn to scale. The function of these retainers is similar to those of the first embodiment described above.

The retainers of the hook assembly 100 for each embodiment have been illustrated as depressions along a surface in which the shank of a hook may rest. However, a retainer may be any element that impedes the rotation of a hook at some predetermined angle relative to the other hook, to the base, or to another member. For example, a retainer may comprise a depression on a surface that engages with an elevation on the shank of a hook, or conversely a retainer may comprise an elevation on a surface that may engage with a depression on the shank of a hook. This latter case may be practical for a large-diameter or a shank having a flat surface.

The foregoing embodiments are exemplary and should not be interpreted as limiting the scope of the present invention. Various implementations and combinations of these embodiments have been recognized and anticipated. It is therefore intended that the appended claims cover all such embodiments that do not depart from the spirit and scope of the present invention.

What is claimed is:

1. A hook device comprising:
   a base comprising an axle having a longitudinal axis perpendicular to a plane;
   a first hook comprising a first sleeve disposed above a the plane rotatably connected to the axle, a first shank disposed predominantly below the plane but for a portion of at least a first retainer defined thereon, and a first bend disposed above the plane defining a first opening; and
   a second hook comprising a second sleeve disposed below the plane rotatably connected to the axle, a second shank disposed predominantly above the plane but for a portion of at least a second retainer defined thereon, and a second bend disposed below the plane facing opposite the first bend and defining a second opening; wherein:
   the first and second hooks are capable of rotating past each other and crossing each other twice; and
   the first retainer engages with the second retainer when the first bend substantially overlaps the second bend.

2. The hook device of claim 1 wherein:
   a third retainer defined on the first shank engages with a fourth retainer defined on the second shank when the first bend does not substantially overlap the second bend and the first opening faces toward the second opening; and
   a fifth retainer defined on the first shank engages with a sixth retainer defined on the second shank when the first bend does not substantially overlap the second bend and the first opening faces away from the second opening.

3. The hook device of claim 2 wherein the second bend is shorter than the first bend.

4. The hook device of claim 3 wherein:
   a medial segment of the first bend is separated from the plane by a gap; and
   a tip segment of the second bend is separated from the plane by a gap.

5. The hook device of claim 1 wherein the second bend is shorter than the first bend.

6. The hook device of claim 5 wherein:
   a medial segment of the first bend is separated from the plane by a gap; and
   a tip segment of the second bend is separated from the plane by a gap.

* * * * *